US012801577B2

(12) United States Patent
Chacko

(10) Patent No.: US 12,801,577 B2
(45) **Date of Patent: *Nov. 17, 2026**

(54) UNIVERSAL FILE VIRTUALIZATION WITH DISAGGREGATED CONTROL PLANE, SECURITY PLANE AND DECENTRALIZED DATA PLANE

(71) Applicant: Peter Chacko, Ernakulam (IN)

(72) Inventor: Peter Chacko, Ernakulam (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/883,060

(22) Filed: Sep. 12, 2024

(65) Prior Publication Data

US 2025/0004996 A1 Jan. 2, 2025

Related U.S. Application Data

(63) Continuation of application No. 16/723,772, filed on Dec. 20, 2019, now Pat. No. 12,321,320.

(30) Foreign Application Priority Data

Dec. 19, 2018 (IN) ............................ 201841022971

(51) Int. Cl.
*G06F 16/188* (2019.01)
*G06F 9/445* (2018.01)
(Continued)

(52) U.S. Cl.
CPC .......... *G06F 16/188* (2019.01); *G06F 9/4451* (2013.01); *G06F 16/164* (2019.01);
(Continued)

(58) Field of Classification Search
CPC .. G06F 16/188; G06F 16/164; G06F 16/1824; G06F 16/1748; G06F 9/4451;
(Continued)

(56) References Cited

U.S. PATENT DOCUMENTS 10,466,933 B1 * 11/2019 Bysani Venkata Naga ................ G06F 11/1464
2016/0191378 A1 * 6/2016 Gopisetty .......... G06F 9/45533 709/238
(Continued)

*Primary Examiner* — Ken Hoang

(57) ABSTRACT

The present disclosure relates to Universal File Virtualization (UFV) that functions like a single virtual data hub spanning on-premise storage at various data silos, data centers cloud data resources stored in IaaS, PaaS and SaaS, remote office and branch office and hybrid-clouds primarily catering secondary data storage combining cyber resilience technologies, information security, file storage and object storage technologies. The proposed solution is built upon disaggregated control plane, security plane and decentralized data plane architecture. The system controller, security controller and Universal File System modules implement various file virtualization, security or data services algorithms to data that passes through it. The present disclosure also brings in a new concept called UFV, implementing a secure, UFS spanning all disparate data sources of a corporation distributed across geographies and cloud services, with centralized control plane, security plane and a decentralized data plane built out of secure vaults controlled by a data controller.

5 Claims, 7 Drawing Sheets

(51) Int. Cl.

| | |
|---|---|
| ***G06F 16/16*** | (2019.01) |
| ***G06F 16/174*** | (2019.01) |
| ***G06F 16/182*** | (2019.01) |
| ***G06F 21/62*** | (2013.01) |
| ***H03M 13/37*** | (2006.01) |
| ***H04L 47/193*** | (2022.01) |

(52) U.S. Cl.
CPC ...... *G06F 16/1748* (2019.01); *G06F 16/1824* (2019.01); *G06F 21/6218* (2013.01); *H03M 13/373* (2013.01); *H04L 47/193* (2013.01)

(58) Field of Classification Search
CPC . G06F 21/6218; H03M 13/373; H04L 47/193
See application file for complete search history.

(56) References Cited

U.S. PATENT DOCUMENTS

| | | | | |
|---|---|---|---|---|
| 2017/0286717 | A1* | 10/2017 | Khi | H04W 12/10 |
| 2018/0115577 | A1* | 4/2018 | Shukla | G06F 21/55 |

* cited by examiner

UNIVERSAL FILE VIRTUALIZATION WITH DISAGGREGATED CONTROL PLANE, SECURITY PLANE AND DECENTRALIZED DATA PLANE

CROSS REFERENCE TO RELATED APPLICATIONS

The present application is a continuation of U.S. application Ser. No. 16/723,772, filed Dec. 20, 2019, which claims the benefit of priority to Indian application No. 201841022971, filed Dec. 20, 2018, the contents of each of which are hereby incorporated by reference herein in their entirety.

TECHNICAL FIELD

The present disclosure is related to Information and Storage Security, Wide Area File Storage Virtualization and Data Protection. Invention is particular focusing on cyber resilience and data protection aspects of fragmented information systems in a global enterprise with different forms of IT silos across on-Premise locations and cloud services.

BACKGROUND

Cloud computing, cloud storage networking are quickly becoming the way Information Technology (IT) and storage is delivered. With cloud scale storage systems, customers can now take the advantage of various cloud resources, on demand, without spending an upfront investment. Vendors such as Amazon, Rackspace offers storage resources to customers delivered on internet. Customers can now buy a minimal storage resource in their own data center and can avail cloud storage as they added.

Cloud storage is very attractive for those customers who are on a low budget or those who cannot predict their storage demands or those who want to store their mission critical data in well protected, SAS-7011 type tier 1 data centers that they cannot altered otherwise. Cloud storage also offer various cost advantages in terms of operational expenses, as they don't need to spend dollars on managing, administering storage systems.

As other conventional Wide area, distributed file systems are used for primary storage use cases, distributed locking, concurrency control are big challenges and make the file system deployment complex in a multi-data center, multi-location scenario.

In typical scenarios, a company with multiple sites, may allow users to store data in multiple storage systems, store data in various cloud services such as Google drive, Dropbox, while archived data may be in infrastructure clouds such as Amazon Simple Storage Service (S3) or Azure or similar. File data may be in hosted servers such as in an IaaS cloud or Software as a Service (SaaS) application stores. So, an IT head faces new challenges for managing data in multiple storage silos, to enforce storage management policies, security controls, GDPR data compliance requirements and a universal access and search, regardless of where it is stored. New Cyber threats needs a data platform that provide finest visibility across all of their data assets, while actual data stores have to be protected and isolated from attacks like ransomware and related cyber threats. In today's storage architecture, data is typically stored in a single location leaving the IT more vulnerable to ransomware attack. If a single site is compromised, full data is lost. This is a single point of breach (SPOB) like very familiar Single point of Failure (SPOF).

Clearly, a solution is needed for decoupling physical file storage, from where the physical storage can be accessed and manipulated in alignment with business policies and also in the way data foundation is built.

When customers use many cloud storage providers, SaaS/IaaS/PaaS services and data in multiple locations, there is no mechanism to have a unified view of all storage that lives in all storage silos with a file system level access semantics, and there are no benefits of virtualization that span across all such silos. There may be tools that bring together all data at one place and provide access with a Graphical user interface. But a solid data platform, that provide a file system interface to user, with integrated file virtualization across disparate storage silos are the clean gaps in the industry today. If the cloud provider goes down, or goes out of business, still data becomes unavailable. If cloud storage is temporarily disconnected there has to be way for the host based applications or the local storage gateway based applications to continue functioning. Data may flow to cloud in an un-controlled manner, and need a way of data classification and then tier the data across. Applications may use traditional protocols like Network File System (NFS) or Common Internet File System (CIFS).

If the data is stored in public cloud storage, there has to be a way of translating conventional protocols to cloud Application Program Interface (API's)/semantics, so that customers can adopt cloud storage without disrupting their existing applications. Customer data may be at huge risk if all the data owned by cloud storage applications is stored in a single cloud that is owned by single administrative authority which may go out of business. There has to be a way for pooling storage resources across multiple providers, and gets it delivered to host or gateway based storage applications, in such a way that all the above problems are eliminated. When cloud storage is accessed by a host, if the connection to cloud is lost, host should be able to do its job. In a conventional data protection infrastructure, there has to be a way of automatic scaling of data to cloud, transparently, without impacting applications. Data should be virtualized across different storage systems within a data center or across multiple cloud providers. So an automatic integration of cloud storage into host, or data center, is required in such a way that cloud availability, security, or integration should not be an issue, to implement cloud-native, low cost and scalable data protection environment, with intelligent file level storage virtualization. Separate data silos can be protected, migrated, archived through central data services controller which is also called SD-Controller in this invention.

There have been many distributed file systems or wide area file systems. But it all runs in homogenous storage interfaces and protocols though may be running in different Operating systems. All such file systems were designed for a campus LAN and built before the era or public Cloud. None of this File system support dissimilar storage connectors. None of these file system has the concept of centralized security plane, control plane with decentralized data plane architecture. Most of these file systems are designed for primary storage use cases and do not have any built in content analytics or data classification which can be applied universally across all data silos. None of the existing file systems have the ability to integrate various systems data, at secondary storage level, based on the data criticality and security profiles across the IT silos of a corporation. None of the existing file systems have the concept of storage intrusion detection and prevention. None of the existing file systems have the ability to tolerate single point of attack or built before the era of ransomware. Existing storage systems lack data security as a foundation feature, though it offers mechanisms to use encryption or access control. None of the prior-art support security by design and default. None of the existing innovations has the ability of system-defined architecture with a central controller, security controller and data controller all working independent of actual user data location making it unsuitable to provide unified data services across disparate data silos.

SUMMARY

The present disclosure relates to universal file system which functions like a single large system spanning on-premise storage at various sites, cloud services, cloud data resources stored in IaaS, PaaS and SaaS, Remote office and branch office and hybrid-clouds.

Universal File Services, Universal File Virtualization, in a Wide Area Network (WAN) environment, spanning all data locations of a corporation, cloud provider or any form of IT organization including remote offices, branch offices, head quarter data centers, cloud servers and different forms of cloud services including IaaS, PaaS and SaaS. Invention is a lifeline in a GDPR (General Data Protection Regulation) compliant data stores, as there is a dire need for central data governance and data security built-in by design. Cyber threats, the likes of ransomware virus, requires additional security for data stores, in-built data services, and a central control, which is realized through this invention. More particularly, embodiment of the invention also provide a secure way to integrate fragmented storage silos across disparate locations deploying different kinds of storage systems using different storage protocols or storage interfaces. Embodiment of the invention integrate IaaS, PaaS, SaaS data stores, various locations and data centers of a corporation, private cloud storage, public cloud storage, with intelligent, replicated metadata controllers, also known as system controllers, in the middle acting as the central hub of intelligence, having separate security services monitoring every storage activity with a decentralized data plane. With the invention, actual location of the file data at any location, any storage silo, any cloud is decoupled from access semantics, with security by design and default tenet-realizing a truly Secure, Universal file virtualization across Wide Area Network.

Through the Universal File System interface, data located at any data sources owned by a corporation, can now be accessible as if, it is located in the local drive of the PC of the user, sitting in the corporate data center. "Universal" means "covering the entire data universe, be it remote office, branch, or clouds across different forms of a Wide Area Network. All "data universe" of a corporation is made as simple as a single "local drive" to a user or an administrator. Invention built upon a split control plane, security plane and data plane architecture. The metadata controller and on-premise storage gateways implement various file storage virtualization or management algorithms to data that passes through it. All technologies are applied across various cloud providers, storage sites and cloud applications This disclosure makes data at any storage sites, cloud service, cloud server, branch office, remote office or any file at any app of a corporation, appear and accessible as if a local file system at any on-premise controller. The present disclosure also brings in a new concept, called "Universal File Virtualization" implementing a Universal File System with a centralized control plane and a decentralized data plane backed by hybrid-clouds and or secure Data vaults allowing a data user to access any file data located anywhere, be it in a remote office PC, branch office server, IaaS server, SaaS services, PaaS platforms, data is available is it's in the local drive of the user's PC, and can do whatever he used to with his local files making data control, visibility and security for data stored outside the corporate data center, simple and secure.

The present disclosure relates to a set of methods and architecture for implementing s universal file Virtualization and also known as Universal File System (UFS) with various converged file services, having a single global data fabric converging various file storage silos, with separate control plane, security plane and a decentralized data plane, built upon a set of Universal File Virtualization and data services methods, across on-Premise, IaaS, PaaS, SaaS data sources, hybrid-storage clouds with or without cyber-secured, secure Data Vaults"

Throughout the disclosure, invention may be referred as a UFS (Universal File System).

DETAILED DESCRIPTION

Figure 1:
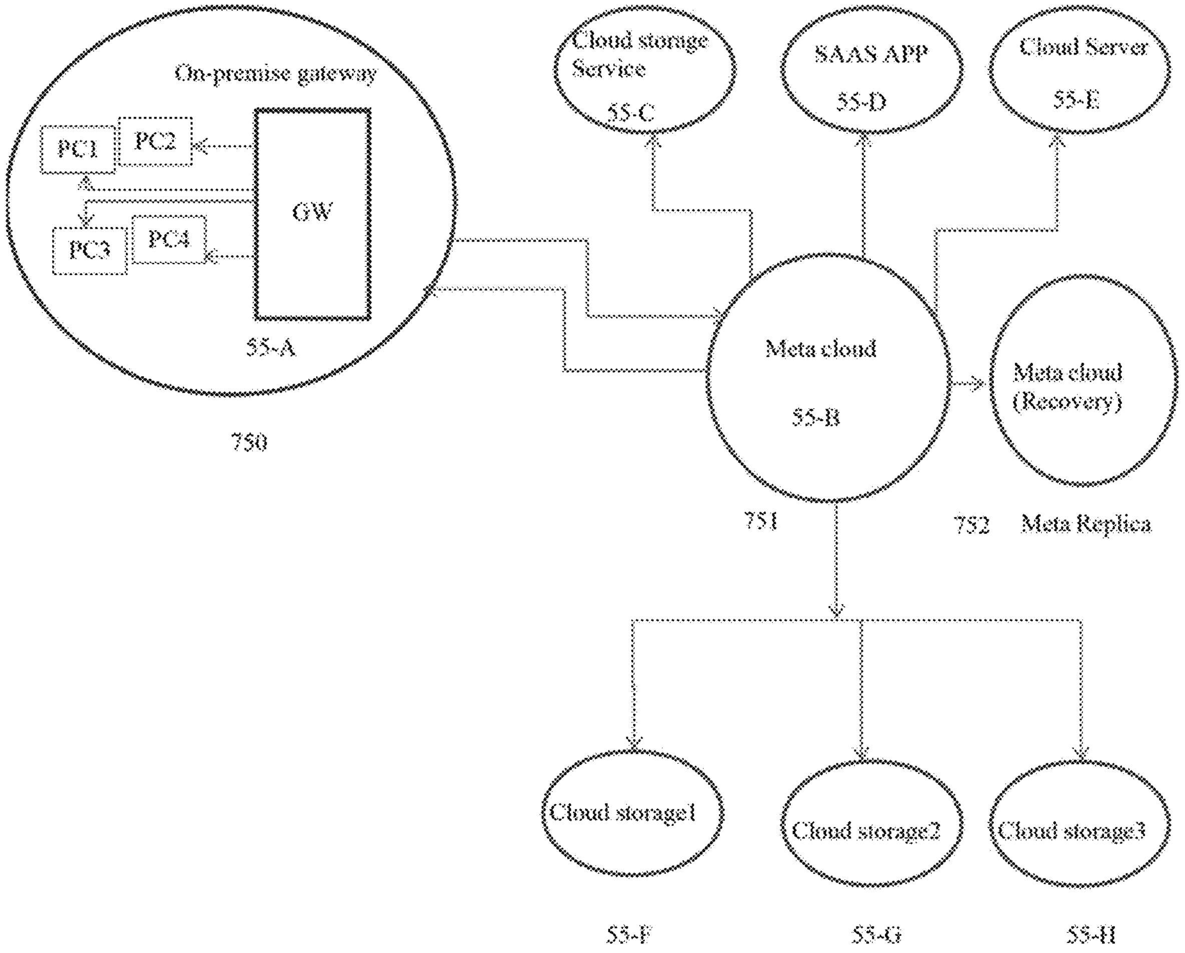
FIG. 1 is a block diagram of implementing a universal file storage where an on-Premise gateway integrate data in different cloud services with a central metadata controller (system controller), while actual data is stored in different storage clouds in accordance with some embodiments of the present disclosure.

The foregoing description has broadly outlined the features and technical advantages of the present disclosure in order that the detailed description of the disclosure that follows may be better understood. It should be appreciated by those skilled in the art that the conception and specific embodiment disclosed may be readily utilized as a basis for modifying or designing other structures for carrying out the same purposes of the present disclosure. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Universal File System, the current invention, also termed as UFS can be used as a file system with security by design, central control and decentralized storage. While UFS can be used for the primary use cases, UFS is optimized and specially built, to work as a secondary storage platform. As such need for complex locking or concurrency control or network latencies are not important unlike traditional Wide Area File System. As UFS is meant to use cases such as data governance, data services convergence, data security rather than application access, data at actual sources, may not need to be up to date with what UFS expose through its file system interface or through its central system controller interface. In this perspective, UFS can be considered as a secondary storage data virtualization, meant for data administrators, data protection officers, data compliance officers and data users, than meant to be consumed by an application such as database, needing primary storage access experience. What makes the invention truly an industry exclusive is, its disaggregated control plane, data plane with decentralized secure vaults, and security plane with converged metadata, security and data services. Invention uniquely combines data management, data protection, data control and visibility, storage security at single, virtual file security foundation.

The accompanying descriptions are for the purpose of providing thorough explanations, with numerous specific details. The field of cloud storage/networked storage is so vast that many different variations of the described and illustrated inventions are possible. Many implementations are possible with ideas that can be derived from this, that match new protocols of storage or different data center environment. Ideas or combination of sub sets of ideas described herein can be applied to a corporate data center environment or a Local Area Network (LAN) environment. The accompanying description is for the purpose of providing a thorough explanation with numerous specific details. Of course, field of cloud and storage networking is such that many different variations of the illustrated and described features of the invention are possible. Those skilled in the art will thus undoubtedly appreciate that the invention can be practiced without some specific details described below, and indeed will see that many other variations and embodiments of the invention can be practiced while still satisfying its teachings and spirit. For example, although the present disclosure is described with reference to cloud storage, it can similarly be embodied in any form of utility/grid based storage clusters or data centers running various protocols including Internet Small Computer System Interface (ISCSI), Fibre Channel over Internet protocol (FCIP), Cloud Data Management Interface (CDMI), Network Attached Storage (NAS), Hyper Text Transfer Protocol (HTTP), Structured Query Language (SQL) and Agile open source web development and E-commerce (AoE) etc.

The process features, or functions of the present invention can be implemented by a computing device. As an example, computing devices may include enterprise servers, application servers, work stations, personal computers, network computers, network appliances, personal digital assistants, set-top boxes, and personal communication devices.

Definitions of Technical Terms Used:

Cloud: is network or networked data center comprising a group of computer, network and storage devices, running machine executable program instructions or storing or processing machine storable digital data. Data access is first received by the firewall, and then application traffic is processed by the virtualization layer based on processing provisioning logic and billing information etc. The other key part is virtualization layer that virtualizes physical resources. If it is cloud computing, this virtualization layer typically is a hypervisor like Xen, Xen as VMware, if this is cloud storage, then this is a file virtualization layer that virtualizes the underlying file servers like denoted by 1006.

ROBO: ROBO stands for Remote Office, Branch Office. A typical corporation may have central site, regional headquarters, remote office, branch offices where employees may be working from.

File Servers: File server is a server machine where it runs a standard network file access protocol like NFS (developed by SUN Microsystems) or CIFS (developed by Microsoft). File access is issued by any computer connected to IP network, which performs file access over NFS/CIFS protocol.

A proxy is also a computer system that intercepts some sort of traffic over the network, and does some processing and then 'redirects the request to another server, and receives the request back and sends back the request back to the original client. In the context of invention, the proxy here intercepts all the traffic between the client and to a destination cloud, hence called cloud proxy.

Redundant Array of Inexpensive Disks (RAID): RAID is data protection technology where different blocks of data are mirrored, stripped or per encoded, so that if any one or more disks fail, data is still recoverable. There are various types of RAID. RAID 0 is a simple stripping where different blocks of data are stripped into various strips and written into different disks. RAID 1 implements mirroring. RAID 5, 6 all involves using per encoding. There are other enhancements like erasure-coded RAID in the literature.

Cloud Application Services versus Cloud Storage Services: Cloud Application services mean, services such as Google drive or Dropbox or box.net, where users use it as part of an application, in most cases. For example, Dropbox storage is used as part of Dropbox file sharing and collaboration tool. Google drive is used as part of Gmail. Similarly, various SaaS applications are used.

Cloud storage services, mean public storage clouds, meant for delivering RAW storage in various forms. For example Amazon S3 is an object level storage service, where as it provide block service through Elastic Block service and compute services through EC2 etc. Other vendors offer similar models. Typically, cloud storage application services, in turn use public cloud storage services for final placement of user data.

Meta data Controller: System and computer systems, which are meant to store, create, translate, process, communicate various forms of intelligence, or data for controlling or changing the behavior of actual user data.

Private, hybrid, public, Federal: Private cloud is a private implementation of an enterprise for its own use. It can also be hosted in a third party provider, but owned and managed by the customer. Public cloud is hosted, owned and managed by the third party provider. Hybrid and federated cloud is different amalgamation/union of private and public clouds in accordance with the policies of the providers involved.

Hosted private cloud storage is dedicated, third-party managed cloud storage, owned by customer or provider.

Cloud file is the file stored in cloud storage. Cloud file virtualization involves virtualizing access to cloud file in a way that transparently redirect the file access.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended. For example, as an aid to understanding, the detail description may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the above detailed description. Some Technical Terms of the Invention are Described Below:

Data set: This is data layout, representing group of data bytes, stored in a computer file. It contains metadata, security data and actual data. Sometimes data set may contain only metadata. In some embodiments, it may contain only security data encoding the access control attributes, permissions, user ids, security credentials, data classification attributes of a file such as classified, public, confidential or user data or metadata or in any combination. File metadata include information for identifying the file, file ownerships, file locations and so on and so forth. Various forms of data layouts can be used as different forms of computer science data structures can be selected. In an exemplary embodiment, it could be list of comma separated key, value pairs for metadata. Metadata contains information such as presence of metadata; number of user files stored in this data set, location of the user data in the file carrying the data set, location of the next metadata pointer, start of user data section, start of the security data section and can contain more such security, metadata and file storage parameters. It's similar to a Zip file or Tar file, which contains the metadata for all member files, used for extracting individual files.

Agent module: This is a system that's installed in a PC which has system programs that can navigate file systems, looking up file changes, compare file change against normal changes or abnormal changes such as ransomware activity. This agent system has the capability to package multiple files across different folders in a single data set and send to metadata controller or to data plane components for further processing and storage.

Ransomware attack signatures: Ransomware can encrypt a file. This equates to full file change. It can remove the contents. This equates to drastic file changes. Ransomware can rename files. This also equates to drastic data changes of the original file name. Ransomware can do data exfiltration, which equates to huge data transfer across network. All these infection signatures can be used to detect any ransomware attack pattern.

Storage partitions: UFS has the built in data classification. This means that UFS understands the file classes and treat data accordingly providing different types of Quality of Service on data security and underlying storage architecture. UFS in its global name space, allocates various partitions to treat data according to its type and class. For example, Archives partition treat all data stored in it as long term Archives, UFS has a central GUI based configuration module which will take input from data administrators on various data classification parameters such content in user data, content in file names, ownership and so on and so forth. UFS also supports versions. In one embodiment, UFS update every new data which is validated as good data to new version of the storage epoch.

Wherever Ransomware is mentioned, it is equally applicable in different forms with adaptations to other network worms as well.

Secure Vault, also described as Data Containers: It's very common to store file level data in file systems or in object storage systems for scalability. Typical object server listens on an IP and a port which is accessible from any network service. Data Containers (Secure vault) is a core part of the invention, adding secure network isolation capability to traditional object storage. Secure vault store data in the form of immutable objects while the system containing the objects does not listen on an IP or a port. Using an ephemeral IP and port, it connects to a component in the UFS module called data proxy, gets authenticated through open SSL channel, and initiates a TCP connection. This data Proxy performs the role of synchronization of all data without needing a connection initiation to secure vault. Data proxy is included in UFS module, System Controller and Security Controller for data communication with data containers Once TCP connection established, TCP client takes the role as a server and flow of TCP stream is reversed. This way, only trusted service running in UFS module, can exchange data with secure vault through this mechanism of reverse TCP flow, preventing ransomware attacks to secure vault. As UFS modules, secure vault systems are continually monitored through security controller, ransomware attack is reduced even further. In some embodiments, data containers will by hybrid-cloud storage services or purely public cloud services. Secure Vault or data containers can be built out of mix of on-premise vaults and cloud services, forming a hybrid-cloud based secure data vault which is connected by data controller to UFS.

Data controllers: Data controller is the interfacing services running as an independent system or as part of UFS module or system controller, depending upon the embodiment of the invention. Data controller, typically part of the UFS module, which is connected to data containers or secure vaults. Data controller implement data services, data dispersal using various forms of information theory such as reed-solomon, transform user data to object format and send the transformed data to data containers.

SD controller: SD controller or System Defined Controller is a sub-unit integrated in System Controller, taking configuration and management data from a data officer or administrator. SD controller further passes this to system controller which re-distribute to security controller and UFS modules.

Data Plane: Data plane includes all components where user data is stored and received from.

Control Plane: Control plane include all components storing metadata, configuration data and management data. Metadata controller (system controller) is the key part of control plane.

Security Plane: Security plane receive and store all security profiles, security configuration data and re-distribute to data containers, UFS modules and System Controllers.

All file level data stored in end systems in remote offices, or in servers in branch offices or in HeadQuarter data centers or in SaaS data services, are consolidated by copying, backing up or through archiving. Such consolidated data is then stored in a decentralized data foundation. In between, data may be transformed through encryption, compression, erasure coding and deduplication. These transformed data streams are stored in cloud storage services or secure vault, in the form of object files. As source files are transformed into more than 2 fragments in the form of object files, any data loss will not affect the data availability. As individual fragmented objects are stored through data transformation with encryption and or erasure coding, individual fragment loss will not cause any data leaks. When fragment objects are stored in erasure coded, decentralized secure vault or across multiple cloud providers, ransomware attack is prevented to a near-impossibility and also with improved cyber resilience as no complete piece of data is stored anywhere.

Referring to FIG. 1, 750 is a block diagram of the on-premise IT center of a company, where 55-A inside the diagram is a system module running in a PC that allows client machines labeled as PC1, PC2, PC3 and PC4 connects with 55A over a standard NFS or CIFS protocol interface. 55A is also defined as the on-premise gateway, as part of the invention. On-premise gateway extracts various data from 751, which is to be explained shortly. Entities labeled as 55-C, 55-D and 55-*e* can be various cloud services such as Google apps or System as a Service (SaaS) s or hosted cloud servers. Through the cloud-provider supplied APIs, 751 which is a metadata cloud storage service, make a copy or extract sufficient metadata, into a suitable storage medium in the metadata cloud storage which is embedded as part of the system. 751 then erasure code the file data, and store different fragments to various public cloud storage services such as Amazon S3 or Azure from Microsoft or similar cloud storage systems. Information to retrieve all these data, which is also known as metadata, is stored in 751, and is also replicated to 752 for avoiding single point of failure. On-premise gateway, 750 "syncs" this metadata and the NFS or CIFS protocol service, and can now see all file objects stored in 50-*c*, 50-*d* or 50-*c*, as if its local. Data access results in an on-demand data transfer between 50-A and public cloud storage services (50-*f*, 50-*g* and 50-*h*).

Figure 2:
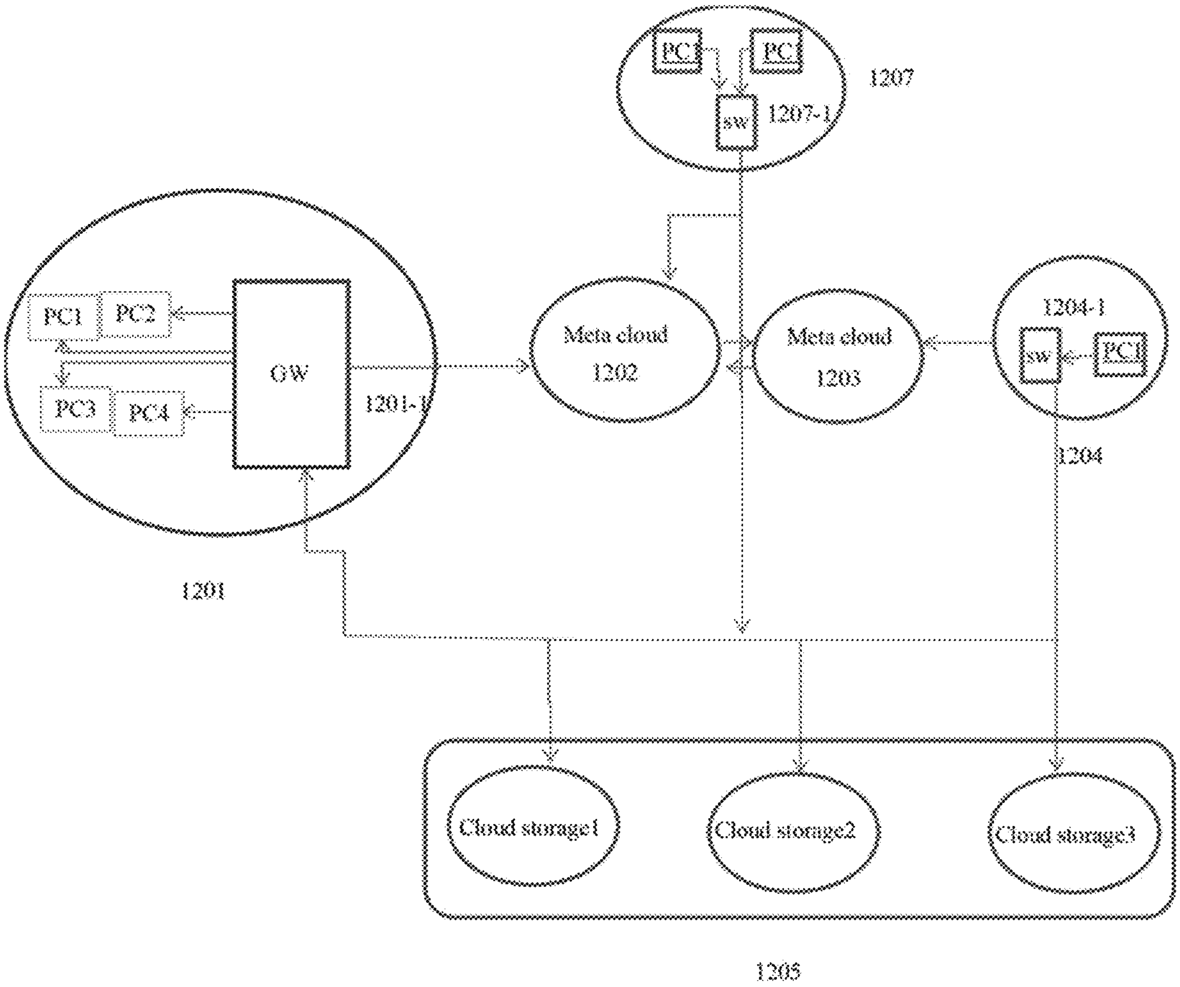
FIG. 2 is a block diagram of a 3-way, distributed file storage, implementing universal file storage, with 3 on-premise locations, without any cloud services, while a subset of the file data is in public cloud storage services in accordance with some embodiments of the present disclosure.

FIG. 2 discloses another exemplary embodiment of the present disclosure. 1201, 1207 and 1204 are different on-premise locations having the same setup of 750 of FIG. 1. Each of 1201-1, 1207-1 and 1204-1 are syncing metadata between the metadata cloud 1202, which is a centralized distributor of metadata and the data-routing proxy of actual data to and from the various cloud storage services (1205). As each of the on-premise gateways syncs metadata to this centralized metadata repository, and full data is directly available in public cloud storage services, all data and meta data are now available in every on-premise gateway. Hence, data captive in any location is available for access and view in every other location, while data is physically stored elsewhere-hence the universal file storage virtualization as this invention truly de-couples file access and file storage, in novel ways. 1205 is the backup of metadata that's otherwise stored in 1202.

Figure 3:
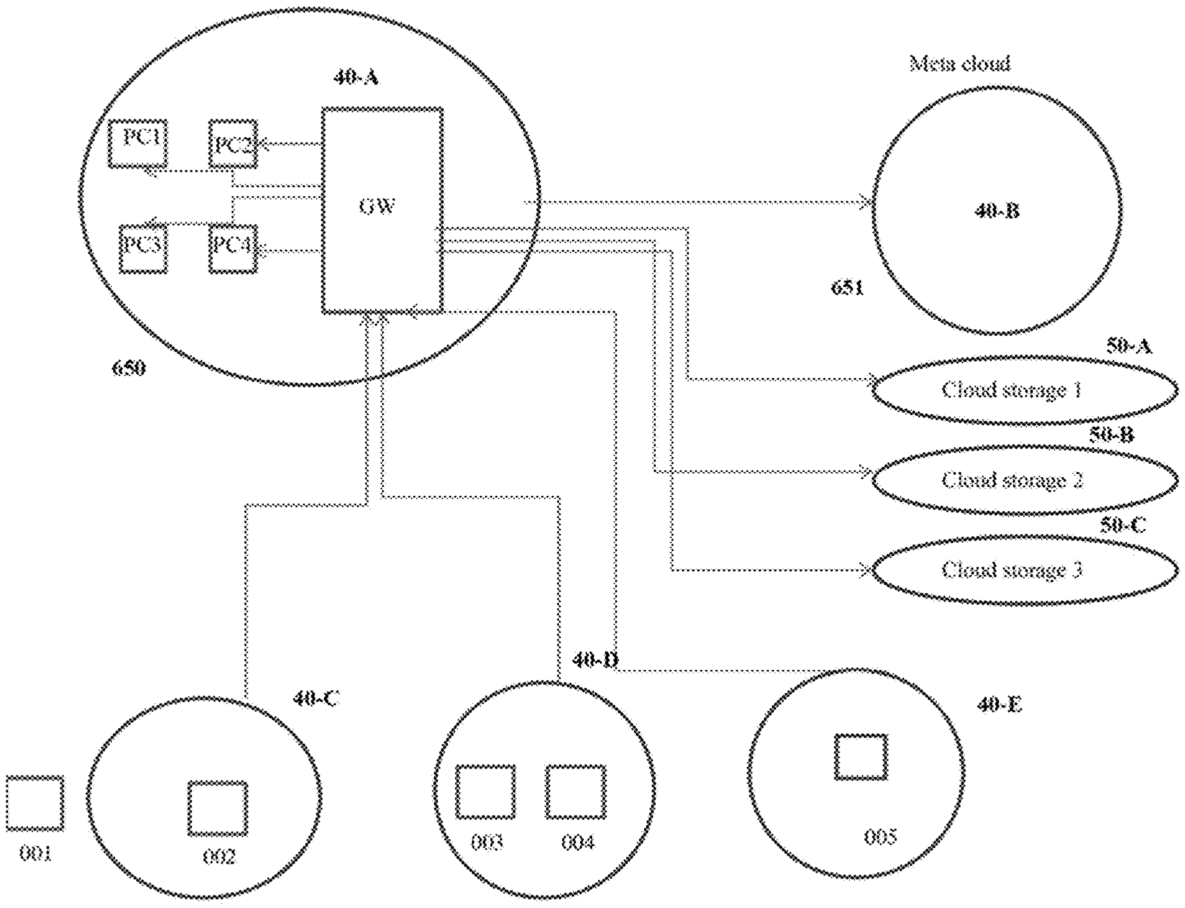
FIG. 3 is a block diagram for implementing file storage virtualization of data from Remote Offices, Branch Offices (ROBO) with multiple storage cloud storage systems in accordance with some embodiments of the present disclosure.

Referring to FIG. 3, a multi-site storage integration with integration of public cloud storage virtualization is shown. 40-C, 40-D and 40-E are branch offices of a hypothetical enterprise, while 650 is a head-quarter. 651 is a system of storage that stores all metadata and some form of backup data. 40A in 650 is a system that is communicating with the agents installed in the Personal Computers (PC) (as labeled as 001,002 etc.). 50-A, 50-B and 50-C are public cloud storage services, which stores dispersed data emanated from 40-A.

Figure 4:
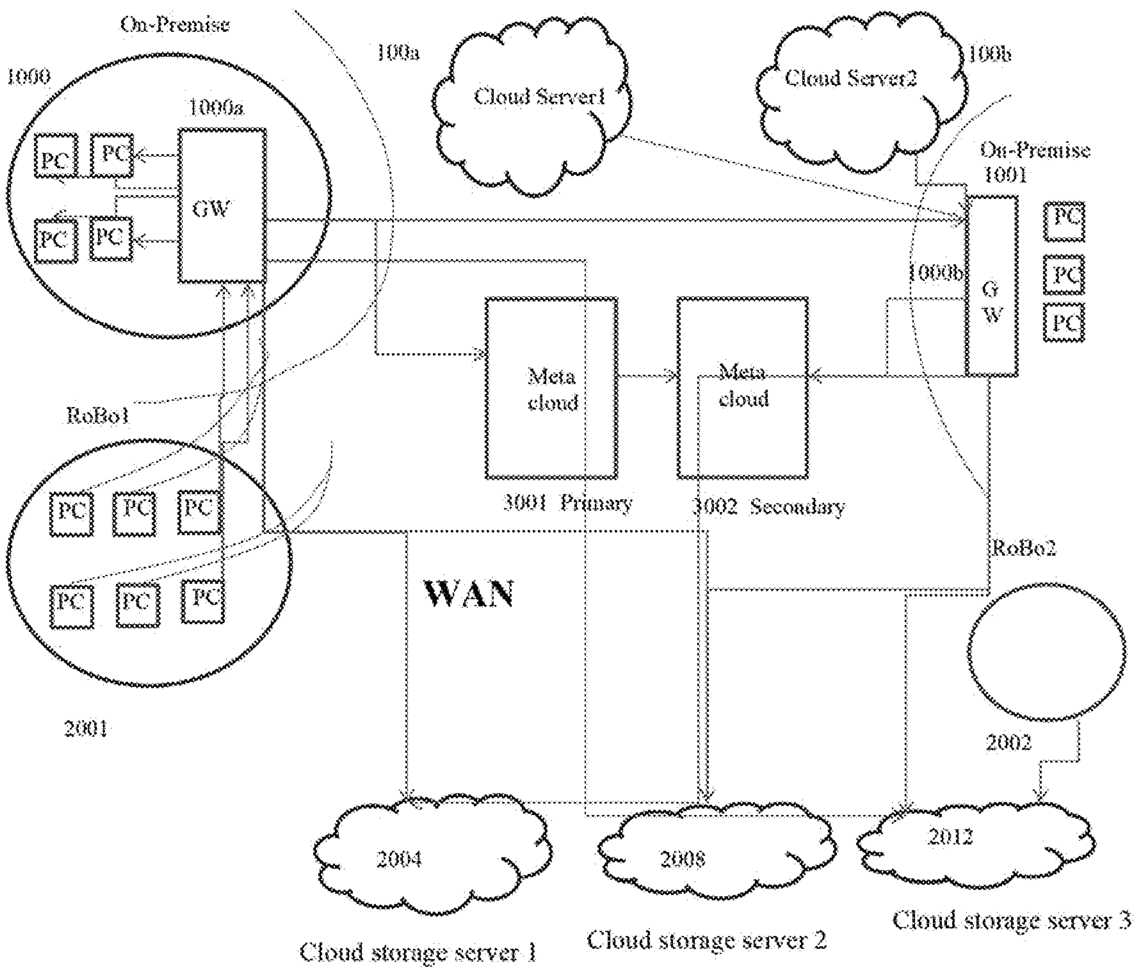
FIG. 4 is a system-defined, universal file storage systems encompassing the data from Remote offices and Branch offices, cloud services, and 2 on-premise gateways with metadata stored separately, while a subset of the file data are stored in dispersed, storage services in various public clouds in accordance with some embodiments of the present disclosure.

Referring to FIG. 4, 1000 and 1001 are two on-premise locations while 100*a* and 100*b* are public cloud storage applications such as Google apps, sales force or similar services. 2001 and 2002 are the remote office/branch offices running various system agents on the personal work stations/other personal devices such as smart phones. 3001 and 3002 are primary metadata cloud and secondary metadata cloud. 2004, 2008 and 2012 are various public cloud storage services. In other embodiment, number of public storage clouds can be five or more, though only three services are shown as a minimum requirement of the invention. On-premise gateways integrate file objects in Remote Office, Branch Office (ROBO) sites, and then to Metadata clouds as explained above. 100A and 100*b* also integrate data to metadata clouds. Metadata clouds in the middle act as the central hub, of all information control and access.

Referring to FIG. 4, 1000*a* and 1000*b* are the on-premise gateways having an instance of metadata controller which serve files locally to all users mounted to the server over standard file access protocols (CIFS, NFS). It also receives the data over backup agents installed in ROBO through its backup server. Backup server then translate all storage metadata, extract data from the backup format, and re-integrate data and metadata separately, in the format NFS and CIFS clients can access, while backup metadata is translated to the form of other metadata controllers, which can be accessed by the on-premise gateway, in a way it can serve files over NAS protocols. As metadata and user data are separately stored, data of different forms can be integrated and served over NAS protocols as a universal file system. Similarly, data created by a browser, uploaded in a cloud service portal, such as 3001, which is the cloud service portal and metadata controller, can be integrated to the universal file hierarchy, by normalizing user data and metadata into a universal format, and delivered as a Universal file system. Similarly, data of other file systems can be combined. With the same idea extended, once Universal file system could extract user data and metadata from its native formats to a universal format, which is recognized by the universal file system, Universal file system can create a single logical view and an interface to access and manipulate files, created by any form of file service (such as NFS, CIFS, backup, archive, object, cloud service, SaaS application, collaboration system, social websites, browser uploads, e-mails) running on any location, as a single large, file storage platform, accessible from anywhere.

Centralized business rules, have the ability to configure, change the way, metadata is distributed, normalized, integrated, and also data is copied, backed up and migrated. Hence, system-defined control and programmability is achieved for universal file storage virtualization. Suitable APIs can invoke requests to hide, or change the way metadata and data are abstracted and exported/imported. Metadata synchronization from the primary and central sites, and also with other sites is implemented through transaction semantics. Referring to FIG. 4, 3001 can be the primary site for metadata, while 3002 is secondary site and 1000*b* is the gateway that integrates the metadata to it. Data movement or replication can happen from on-premise gateways to cloud and on-premise gateways to other on-premise gateways or through a central metadata controller (also referred as system controller) such as 3001. System-defined methods drive the way data is moved, replicated and backed up. For example, system controls can be inserted to replicate certain directories at certain sites to subsets of other sites, and certain data from certain types of cloud services to be migrated and archived while ROBO data to be backed up and replicated to DR sites. System controls can be placed to move certain types of data to be archived, to public storage clouds, with erasure coding or replication as appropriate. System-defined controls can be placed the way data is de-duplicated, that spans across multiple storage services and multiple sites and clouds. These are the methods we invented, to implement Universal data management, driven by system-defined mechanisms, spanning multiple types, storage sites and various cloud services of an enterprise. All the data management and file system can be invoked as a single system, to realize a converged universal file system and data management or universal data management can be implemented as a standalone system.

Universal File Virtualization includes primarily the ability of file being accessible from any location, regardless of where the file stored, as underlying storage here is made virtual. The data storage virtualization further comprises the ability of files being migrated from one location to another location or to public storage clouds for archiving or various data distribution reasons. Also, the data storage virtualization comprises the ability of files being copied from one location to another or across the federation of storage clouds, transparently to the user, for backup or disaster protection purpose. UFS allows virtualizing secondary data also primary data though invention is targeted primarily for the secondary storage market.

All functionalities are internally delivered by the central, metadata controller and on-premise gateway (an instance of the UFS module). Metadata controller (System controller) also processes user data, which is moved to public storage clouds, primarily created at cloud application services or ROBOs. On-premise gateway systems can send user data to public storage clouds directly or through metadata controller.

Figure 5:
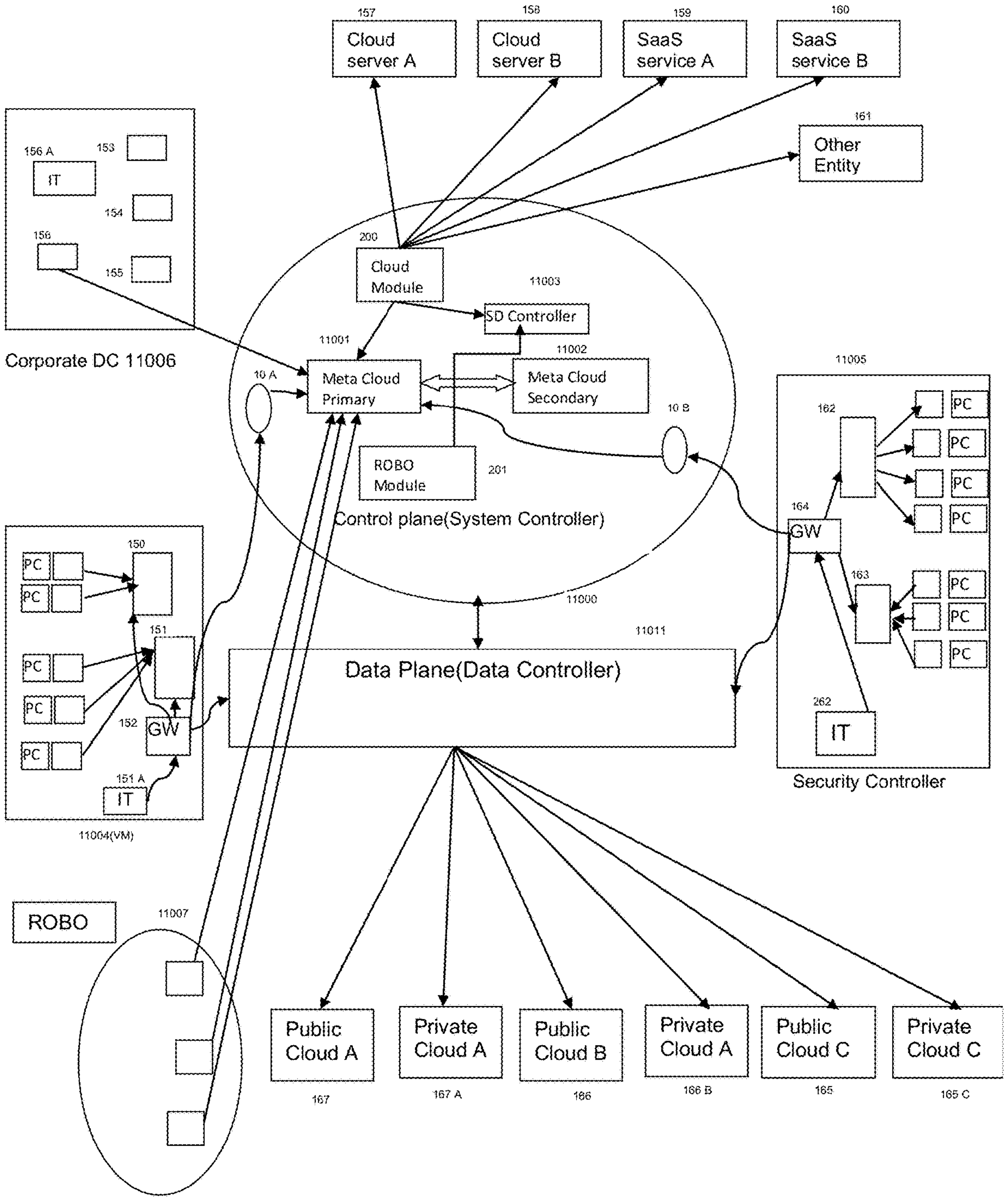
FIG. 5 is another aspect of deployment diagram of various components of the invention with private and public clouds as well as different cloud services.

In an exemplary embodiment, the invention can appear as illustrated by the FIG. 5. Referring to FIG. 5, is a typical IT environment of a large enterprise, having multiple sites and data is scattered across various other services, branch locations or remote offices. 11004 and 11005 are branch location with many IT equipment's, file servers housing hundreds or thousands of employees. 11001 is a remote office. 11006 is the corporate data center. 11000 is the System Controller. 11000 can also be the Head quarter or a Cloud or could also be condensed as Virtual Machine and runs in corporate DC. 11003.11003 can be an application package which can also be run alongside 11001, or as part of 11001 or 156. 11002 is the recovery location of the control plane. 11000 is the system controller, running on primary mode of operation with a centralized architecture. 11001 is the primary meta data controller or the. 11003 is the module that receives system instructions or system-defined methods. This could also be by way of simple provisioning of various data services, such as backup policies from which site to which site, or migration of source data location to destination data location. This also includes the data life cycle management policies of selecting the destination clouds.

For example, a simple table entry could be to indicate that steer backup traffic only to private clouds and archiving data to a set of predefined public clouds. It also could add data classification and information life cycle management policies to determine the actual destination clouds, all controlled by system defined constructs. Data classification parameters also include the content type, strings contained in the file names, owner of the files, type of data silos, type of the files etc. As the invention involve a novel architecture of centrally placed control plane and decentralized data plane. The entire architecture is leveraging an all-new concept of split data and metadata architecture, which allows seamless integration of different data silos to realize the implementation of the invention. Core idea of split metadata and data is to separate the actual location of the data from metadata, so that data silos doesn't come in the way of file access. This way, Universal name space is realized by the invention, as all metadata is centrally integrated, with all information to direct data access from different forms of clouds from the novel implementation of hybrid-cloud system as part of this invention. Referring to FIG. 5, 11001 and 11002 are the primary and secondary nodes of the metadata controllers, which are part of the centralized system controller (also referred as control plane), 11000. All system components running in various PCs at 11007, Gateway systems in various data sites as in 11004, 11005 are part of source side of data plane. Data plane also include various cloud servers as in 157 and 158, as well as 159, 160 and 161 which runs different cloud services. All the different data plane runs storage modules which are using different or same storage access protocols. 11011 is the data controller which executes instructions for data services and data transmission of storing received data from UFS modules. Data controller can be a separate system, or can be an embedded part of UFS modules. Data controller is connected one or more cloud services which are private cloud, public cloud or on-Premise storage vault. 167A is one such private cloud services. These modules are also defined as the data containers.

11005 is the security controller, centrally monitoring every UFS modules and also data containers attached to data controller. System controller receives security profile and security configuration data of various sites and users which then pushed to security controller. Security configuration can include the disabling of a UFS system, if a security policy is set for that particular UFS module. As different data silos have different types of data, security profile of each data source, can be different based on the criticality and sensitivity of the data. UFS module when copy data to secondary storage from client systems, security profile of the data is learned also by the file extensions, file content, presence personally identifiable information etc.

In the context of the invention, Universal File Virtualization if not real time, as invention is not applied to in-band production data. So its storage migration from any source system is first migrated to cloud layer, which is private or public cloud or in any combination. All recovery metadata is created at source storage system, instantly replicated to meta data controller in the control plane system. Various nodes, wanting to offer Universal file virtualization capability then redistribute the meta data from the central metadata plane. With completely distributed meta data, on various source storage systems, which are distributed data plane, invention bring out the radical architecture and method for Universal file virtualization. Referring to FIG. 5 again, 11004 and 11005 are two instances of distributed data silos, in the exemplary representation a branch site. At site 11004, there are two NAS boxes 150 and 151. 152 at site 11004 is an instance of the distributed data plane module and also 11005 has the same role. 11006 is the head quarter data center where 156 is a NAS based interface. 153, 154, 155 are also various forms of storage servers. 157 and 158 are two forms of servers in the outsourced cloud provider data center. 159 and 160 are different physical or virtual machines having generated data out of services or could be a SaaS based file services such as Dropbox™ or Google Drive™. 161 is any entity having a data stored, owned by customer. Data can be created, at any of distributed data plane.

At the employee PCs used at location 11007, files get created or uploaded. An installed system component then copy or migrate the file data to a hybrid-cloud based architecture. 165, 166, 167 are public cloud services and 165A, 166A and 167A are private cloud services. Data from PCs at the site 11007 first arrive at ROBO module 201. 201 will extract the file from the data stream, normalize the file path to a universal path such a way that it can be referenced uniquely from any other location, and then look up SD controller service profile, and pass down to data chunking and dispersal layer. 11006 is the data dispersal layer, which is creating data chunks out of the file, either replicate or mix in with error correction codes such as reed Solomon based codes, or simple XOR codes or any equivalent coding technique, as this invention can make use of any code or no code at all. Data is then converted to objects, and each object is uniquely named, and steer to different cloud locations. System definitions are inserted at SD controller (once data is properly placed, all such parameters such target cloud profile, source data location, source file path, recovery file path and target cloud locations, which constitute the additional metadata. This additional metadata is then stored in 11001, and replicated instantly to 11001. These additional metadata is then redistributed to any other on-Premise gateways, such as 152, labelled as GW in 11004 and also 164, labelled as GW in 11005. These gateways is running a uniquely built NFS server, which has a split data and metadata plane architecture. This also means that data and metadata do not need to be co-located.

In traditional file server, metadata and data of the file system being served is created from the same file system having data co-located in the same storage volume in a single node or as part of different nodes. This will not allow the metadata update from central control plane. Hence as part of the invention, NFS server module, is completely built with metadata and data separation in mind, which runs in these gateways (152 and 164 running in sites 11004 and 11005 respectively. Data plane of this NFS module, also understand that data can be local or remotely stored in private or public clouds or on a mix of clouds when cloud profile is hybrid-cloud. Once metadata is updated, any file which gets copied and migrated from 11007 is now accessible, manipulated, updated in real time. This is possible as metadata is now available to the NFS module. Data will be retrieved by appropriate cloud APIs, brought to the GW (152 or 164) and data is delivered to data request clients accessing the data across NAS protocol. Same access is possible, to gateway 164 as well.

Consider now that data stored in proprietary vendor systems 150 and 151 in the site 11004 and also 162 and 163 running in the site 11005. 150, 151, 162 and 163 are NAS appliances or could be File servers, capable of serving files to NAS clients. There could be many NAS clients. In the exemplary embodiment, only few clients are shown, labelled as PC. Additional component of the invention is a module, running in the gateways 152 and 164 that copy or migrate the data from these servers, after leaving a symbolic link in the aforementioned servers and repeats the steps as followed by the system when data is copied initially copied from 11007. If the data is ingested from the gateway 152 in this manner, metadata doesn't need to be redistributed 152 as it will always have the metadata. But central control plane then will redistribute metadata to 164 and 156. IT admin can access any of those files ingested to the system, can now be accessed from other gateways in the corporate data center (11006). Now as one part of the invention, data also can be ingested from source data locations 157, 158, 159, 160 or 161. All data will be brought into cloud module first; cloud module will inspect the configuration data shared by System Controller, and create the data chunks, send the data to appropriate clouds, and feed new metadata to 11001. This meta data controller will then resynchronize the meta data to all gateways and as done for other data sources. So, data from any sources within the enterprise, at any data silos, can now be available universally. This is the core essence of Universal File Virtualization.

Also, data copies and migration and metadata resynchronization all are performed as instructed by the SD controller. As the same technology behind invention also applied as a data management for data stored from any data, name of the invention can also be called universal data management or universal file management.

Universal File Virtualization also provides a universal data fabric, converging all different data silos into a single local drive semantics. UFS module running in any data center can now access any data in any of the silos, be it in SaaS, IaaS, PaaS, remote office location, branch office, as a file system folder, and do anything with it that a user can do with a file system, it brings total control, visibility and overall simplicity for the data infrastructure, without worrying for a single point of failure, as data is decentralized with universal de-duplication, erasure coding/replication, while metadata is centrally protected with continuous data protection mechanisms with replication, corporations get an unprecedented data security and delivery experience for their un-structured, secondary storage systems.

11002, secondary metadata controller also provide recovery mechanisms, High Availability services for metadata, security monitoring services for every gateway deployed in corporate Data centers, centralized log storage of every system, centralized configuration management, and various forms of threat detection, authenticity checking and customer telemetry, providing another layer of security violation detection in the context of cyber-security challenges. As security is part of the UFS module and also built as another layer for monitoring, security functionality also executed in layers, and in different planes. This is another novelty aspect of the invention, as there is no distributed file system, having considered security at all levels, though they incorporate encryption and authentication, which are only the basic aspects of security control.

Referring to FIG. 5, data distribution aspects of metadata plane is shown. Gateway systems (labeled as 152 and 164) are the gateways that have the same shared data of the metadata plane. Metadata created at any such gateway is instantly synced central control plane primary node (labeled as 11001) which is mirrored in replica node. All these nodes are distributed at various data centers, separated by WAN or LAN links. For instance, if metadata module, running as part of gateway 152 generates any new metadata, it will update the primary node of metadata plane, 11001. Primary node of metadata plane will then update the sync pending flags for other gateway, 164 which will subsequently sync the metadata changes back to their metadata module too. If primary node of the metadata plane, 11001 fails, secondary node 11002 can take over the role of primary and no disruption of service will happen.

In an embodiment, the metadata controller is an n-way distributed system, continuously replicating the changes from any site to all instances of the metadata controller. An instance of the metadata controller is running as a part of on-premise gateway, while other instances are running in the cloud. In the invention, data and metadata are truly separated. Hence, intelligent system mechanisms can be employed to drive the data movements across the federation of the storage systems. File storage is truly de-coupled from where it's accessed from, and who, by the methods driven by system controls through the metadata controller. ROBO data can be collected from various agent system running in the user systems, running in ROBO sites, which is communicated to any of the on-premise site, where the server system for agents are running, which receives all data, extract metadata, and transform in some ways, and send to central metadata. On-premise gateway also runs file service as part of its components, which serve files to local site as well as distributing to other sites, through metadata controller. Data can be part of different application or different storage services, and have to be translated into a uniform format, so that any file in any location, can be manipulated as a single large file system.

Hence, the present disclosure implements a Universal file system that encompasses various storage sites, storage application services. Explaining further on uniform metadata format, consider a file is uploaded to a cloud service through a browser. Metadata can be very minimal such as file name, size and source IP or user name. Consider the case of storing the file from ROBO as part of an agent backup. Then additional metadata such as time and day of the backup, backup type, which needs to be translated to same form as a browser uploaded file. Similarly, when file is originally created by the file server, running as part of on-premise gateway, file system specific metadata can be translated to a convenient mechanism. Another example may be, if the file is stored from a windows client, it has special parameters known as windows Access Control Lists (ACLs), which are not created when a file is migrated from a cloud service such as Google drive. Therefore, in the present disclosure, default values for different systems to interoperate are configured.

User can also login to a central portal, where the user can configure the migration policies, which drives the data migration, as the data ages. It can be as simple as moving the file from G-drive to amazon S3 after 6 months of inactivity, to migrate the data from every user on every site and storage locations to multiple storage cloud services through information dispersal, if its older than one year. All the migration across the federation of storage clouds is automated as part of the universal file system. All metadata movement and data movement to make physical file storage location transparent or truly virtualized, is automated as part of the universal file system. The invention makes every data in any location of storage silo as local to every other system and hence called universal.

Central metadata controller is an n-way distributed system, continuously replicating the changes from any site to all instances of the metadata controller. An instance of the metadata controller is running as a part of on-premise gateway, while other instances are running in the cloud. In the invention, data and metadata are truly separated. Hence, intelligent system mechanisms can be employed to drive the data movements across the federation of the storage systems. File storage is truly de-coupled from where it's accessed from, and who, by the methods driven by system controls through the metadata controller. ROBO data can be collected from various agent system running in the user systems, running in ROBO sites, which is communicated to any of the on-premise site, where the server system for agents are running, which receives all data, extract metadata, and transform in some ways, and send to central metadata. On-premise gateway also runs file service as part of its components, which serve files to local site as well as distributing to other sites, through metadata controller. Data can be part of different application or different storage services, and have to be translated into a uniform format, so that any file in any location, can be manipulated as a single large file system.

Hence, the present disclosure implements a Universal file system that encompasses various storage sites, storage application services. Explaining further on uniform metadata format, consider a file is uploaded to a cloud service through a browser. Metadata can be very minimal such as file name, size and source IP or user name. Consider the case of storing the file from ROBO as part of an agent backup. Then additional metadata such as time and day of the backup, backup type, which needs to be translated to same form as a browser uploaded file. Similarly, when file is originally created by the file server, running as part of on-premise gateway, file system specific metadata can be translated to a convenient mechanism. Another example may be, if the file is stored from a windows client, it has special parameters known as windows Access Control Lists (ACLs), which are not created when a file is migrated from a cloud service such as Google drive. Therefore, in the present disclosure, default values for different systems to inter-operate are configured.

User can also login to a central portal, which is part of the meta data controller where the user can configure the migration policies, which drives the data migration, as the data ages. It can be as simple as moving the file from G-drive to amazon S3 after 6 months of inactivity, to migrate the data from every user on every site and storage locations to multiple storage cloud services through information dispersal, if its older than one year. All the migration across the federation of storage clouds is automated as part of the universal file system. All metadata movement and data movement to make physical file storage location transparent or truly virtualized, is automated as part of the universal file system. The invention makes every data in any location of storage silo as local to every other system and hence called universal.

Explaining further on the core invention, Universal File Virtualization methods and Universal File System (hereinafter referred as UFS), Refer to the main FIG. 4 of the core architecture again. 11006 is a corporate Data center, where the main data protection officer or CIO may operates from, while 11000 is the central metadata controller which can be hosted in the cloud, hosted by a provider or hosted in company data center. Meta data controller by itself is self-protective as the primary meta data node, 11001 is replicated in real time to secondary metadata node 11002. System-defined controller module 11003 can provide system-defined instructions to both primary and secondary metadata node. When primary goes off-line, secondary metadata node kicks in and takes over all the services offered by the primary metadata node. External services can contact secondary metadata node, in case it detects primary metadata node went off-line. System defined instructions can be configured or executed by a Web based management GUI as an example. Various data services, security privileges, information regarding remote offices, branch offices, role based access controls, data sharing policies, security policies, data services policies can all be configured, which gets translated as system defined rules to 11003, SD controller. SD controller will drive the movement of data and metadata, as well as the delivery of various data services and data security services for the Universal file system architecture and its various capabilities for different use cases.

Cloud services interfacing module 200, will use appropriate cloud APIs to interact with different cloud services as shown in 157, 158, 159, 160 or 161, on provider-specific APIs. This can be oAuth (Open Authentication) based G-Suite APIs to interface with google applications for example. Open Authentication allows third party services access and manipulate user data on behalf of its owners, once third party providers granted data access. Every SaaS provider provides their specific APIs to read or update metadata or data to its services and data storage. Using google data API one can retrieve files and metadata of those files stored in google drive, and BOX, a popular cloud based storage service, offer its APIs to access its data, so on and so forth.

Cloud service module thus brings in the data and metadata and also can update the data and metadata, as per the instructions from the SD controller, 11003. 11006 is a separate, data dispersal layer where in data can be grouped, partitioned, sharded or erasure coded and then transmitted to different cloud providers or company owned private cloud or any combination of different clouds, forming a hybrid-cloud infrastructure. Data can be split across multiple clouds, or different types of data can be directed to different clouds or as desired by the company policies matching costs, security objectives and contracts set up. For example Amazon AWS™ has a special service for archival workloads at very cheap cost, and it also offers another class of service for online data at higher costs. SD controller can instruct all data placements in different tiers of cloud services offered by same provider or different cloud service providers as per the company policies. 165, 166, 167 are different public cloud service providers, for example AWS, Google™ Cloud and Microsoft Azure™ while 165C, 166B and 167A are private clouds. Hybrid cloud is formed by combining all in different combination.

Like data from cloud services are ingested into the central controller, data can also be consolidated from different branch offices of the company, like as in 11007, 11005 and 11004. 11007 is a small office, where there is only few employees working with few PCs, which direct the data and metadata to 201, that's part of the central system 11000. 201 is also called ROBO module that process data and metadata streams from the agents installed in the different PCs running at the ROBO site 11007. ROBO stands for (Remote Office, Branch Office). Similarly, any number of such Remote offices can be connected to 11000. Branch offices 11005 and, 11004 also can send data and metadata to 11000 like how ROBO sites send the data streams of data and metadata. In a different implementation of this invention, all ROBO and Branch sites can send data directly to data dispersal layer 11006, which then gets directed to actual cloud services. Data dispersal layer 11006 can be implemented as a standalone system, or as a library attached to any module running in any of the systems in any of the locations in the diagram or as an embedded system module which can be running as part of the data transfer agents like 152 in the branch site 11004, or 164 in the branch site 11005 or the system agents running in the PCs of the ROBO, like as in 11007.

In such an embodiment, data will be directly transferred to public cloud services, while metadata will be consolidated at the central metadata controller 11000. 11006 is the corporate Data center, where 156 is the module that provide a file system level interface to every data assets ingested from all remote offices, branch offices and cloud services. 156 has will contact 11001 for metadata updates, and 11002 if primary fails. It will have, in one embodiment, an embedded dispersal layer, having the same functionality of 11006, and through which it will contact various public cloud services to access data. The crux of the invention lies in the combination of 156, that will create a file system level experience to an end user, 11001/11002 centralized metadata controllers with real time replication, and 152/164 example branch gateways that integrate data and metadata from the branches to the universal system. A file system like as in NTFS in Windows, allow a user to list directory contents, access files, change files, copy files into and out of NTFS partition. This is served by a module in the Windows kernel, which stores actual user data in the disks, in different disk blocks. Before NTFS stores data, disk partitions are formatted to store metadata such as Master blocks, file tables, locations of free blocks etc. Actual file contents are stored in data blocks while metadata locates files like Master boot record, file allocation tables etc. also in separate disk blocks. This is fine for implementing in a disk based environment as this is one form of implementing a file system based on technologies without cloud.

The invention creates the same final experience to user that stores all metadata to access user data from the cloud, instead of disk-based data blocks. The module that runs in 156, can be an independent Linux system or a Linux VM that can be accessed over a network, using an IP address. This system can also be mounted using any standard NAS protocol. The invention implement every file system requests, generated at OS layer, and translated to appropriate equivalent requests to cloud. 156 always get updated on every metadata from the metadata controller. Actual data from the public cloud services will be accessed on-demand.

If for example, when a user do a directory listing, OS will translate this to appropriate interface and pass the request to the file system interface of the module. 156 module runs itself as an NFS server, interfacing to OS through the kernel based NFS client. When NFS client kernel module sends a readdir( ) RPC procedure, the NFS server, which is 156 itself, will look up all the metadata stored that it assembled from 11000, and construct the reply for readdir RPC reply, including all the file names, file attributes, file sizes as required to enable the OS provide reply to the end user. Similarly for any real time data update on the file system, NFS client will send READ or WRITE RPCs, which gets interpreted by the NFS server module of 156, and identify which file data is needed from the RPC request based on the file handle information and retrieve the correct file by translating the file to object request based on the metadata information. Its further to be noted that, data flow or metadata flow can happen from any direction, with the exception that metadata always go through central controller and then re-distributed, while data can happen between data sources and cloud storage services and or secure Vault, directly. User data also will go through central controller. Branch server resources can in some cases, send user data to other destinations through central metadata control. Central metadata control functions like a nervous system of all data and metadata flow of a distributed corporation. Purpose of dis-aggregating channels for data exchange, control data or metadata exchange or security data exchange is to enable communication from any to any paradigm. As control plane, security plane and data plane are disaggregated, now any UFS modules can send metadata to System controller and every other UFS module can receive it. As every UFS module send data to data containers every other UFS module can receive data, if they have access to metadata. As UFS module runs a file system which is configured to work with split data and metadata, data access is enabled like a file system on the local storage.

In one embodiment, when secondary metadata control plays the role as a security control point, it will monitor all systems, having data resources, for any anomalies, corrupted files, malicious activities, virus checking, configuration file hardening and related security monitoring services can be performed, as a separate, security plane. All components in the UFS module, can get a gold copy of configuration files, security configuration for OS attributes, management data such as various services enabled for each UFS module and various identity verification services can be performed. Like in any standard system, security and management data will be set by a graphical user interface or through a command line interface at System Controller. System Controller then distributes it to UFS modules and security controller. This separate security plane also performs various security management services for cyber security protection reasons. This separate security plane can also be called as cyber security automation center or Security Plane Controller or Security Operation Center or simply Security Vault. Security Vault constantly monitor every storage input and output activity going on in UFS modules as well as secure vaults. A security administrator can configure various policies and can instruct the security controller to remotely shut down the systems having the data stored in secure vaults or at UFS hosts. This way, security vault offers the capability of multi-site storage intrusion and detection, which is unheard of in the world of storage.

Figure 7:
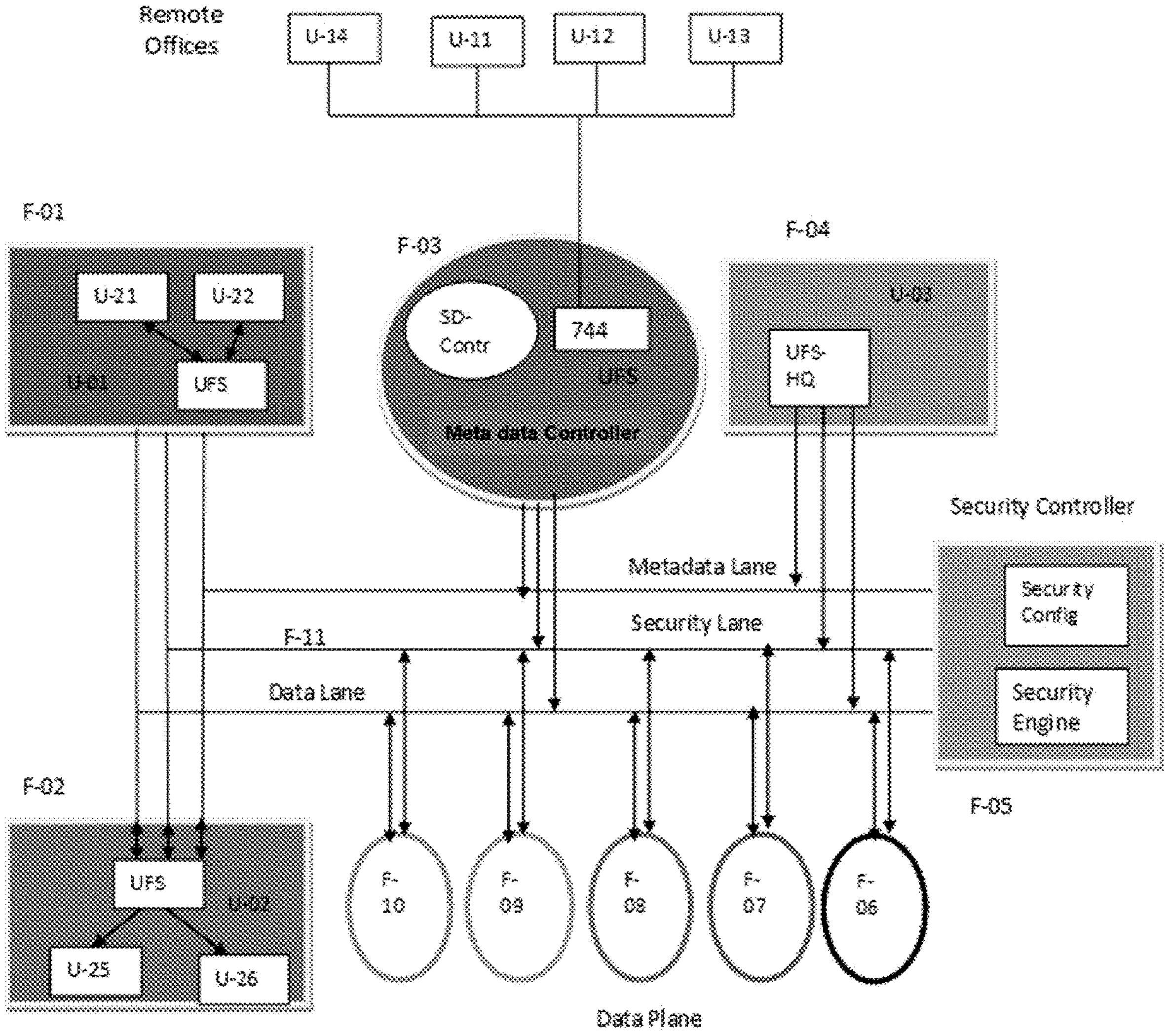
FIG. 7 explains an embodiment with data containers, system controller and security controller with disaggregated data exchange.

Referring to the FIG. 7, central system controller F-03 is at the fulcrum of the invention. SD-controller, metadata controller and UFS module are the main components as per one embodiment of the invention. Metadata controller sends a backup of continuous data changes of metadata to security controller for High Availability and Disaster tolerance. Every site of a corporation has site module of Universal File System (UFS). Metadata controller also has a UFS module. UFS module mainly performs the role as data connectors, connecting data sets from data sources and also making data available to a user as a file system through various NAS (Network Attached Storage) protocols. UFS module connects data through various SaaS provider API as well when data cannot be accessed through NAS. Once data stream is received regardless of the type of data connection interfaces, metadata is sent to metadata controller, data is extracted and sent to data containers storing user data, shown as F-06, F-07, F-08, F-09, F10 in the figure. As F-06, F-07, F-08, F-09 and F-10 contain user data securely, these components are also defined as data containers or secure vaults. Every instance of UFS and System controller (F-03) and Security controller (F-05) has the capabilities of performing various data services such as data dispersal and data transformation to object format and send transformed user data to data containers. This logical part of all interfacing capabilities is defined as data controller. System controller, through SD interface, configure various data containers attached the every data controller instance which is part of UFS and System controller. Data is exchanged from data controller, which is a logical module running in UFS module or as an integral part of System Controller. Data is sent through data path, shown as data lanes; Metadata is exchanged across control path, shown as metadata lanes and all security management and automation is exchanged through security plane, shown as security lanes. Security profile of a user or data silo can be configured through a GUI (Graphical User Interface). For example, security profile of a data silo can be to Security controller has security configuration data and a security engine. Security Engine process all the security events data received at security controller through security lanes and determines if there is any anomaly. If anomaly found, security engine initiate real time response. For example, in one embodiment security event May 3 consecutive failure of authentication at any UFS module. SD controller may have configured security response parameter as Remote System Lockdown. This configuration is the security profile data associated with the data set. In this case further logins are disallowed. Similarly, if there is unauthorized storage resource access is observed, security controller will send the message to UFS module or secure vault to shut down the system. This is akin to bring a new dimension to CIA Triad to information security. In addition to Availability, Invention bring to light that, Un-Availability to rogue users are also a capability of Information assurance platform.

UFS modules are not necessarily meant to be data connectors. It can also play as primary data source itself. Client systems can directly mount UFS module as a virtual NAS system and can stored data at file system semantics. All datasets handling logic will be same.

SD controller can configure various file storage protection policies and parameters. It can set the number of secure vaults to 1, 2, 3 or more. It can also set cloud services similarly. In one embodiment, all data objects can be stored only public cloud services. In another embodiment, some objects can be stored in secure vault and some in public cloud services. All such policies are configured and managed through system defined controller which then program the control plane instructing the metadata controller, data plane instructing the secure vaults and UFS modules and security plane. As the architecture has the unique property of disaggregated control plane, data plane and security plane, security services are uniquely controlled through control plane, regardless of where the data is stored. This also make it possible to integrate disparate storage protocols at different sites as well as different data trapped in different sites, unified as a single, virtual universal File system with security by design and default. Without a separate security plane detached from control plane and data plane, such capability cannot be built. Without a separate control plane, central control and visibility cannot be achieved. Yet another property of data plane is it is decentralized. With decentralization, comes the capability-no single point-of-breach or cyber-attack. The invention offers a novel way of providing true cyber resilience and protection from data thefts and breaches with decentralized data plane, where every object is securely split pieces that stored in different data vaults located at different locations, with any single piece revealing no information or any single loss of any piece having no impact to data availability.

Another salient feature of the invention is the way it prevents ransomware impacted data sets with the known gold copy of the data. UFS has the concept of built in versions that is updated typically performed in every backup time. This is called backup epoch. In between every epoch, new data is stored in a temporary partition. New data sets then subjected to ransomware anomaly detection. Each file object is examined for the change against the previous file object. If any of the file change meets the ransomware attack signatures, a real time are alert is generated and IT staff is engaged for manual verification and to match data validity parameters such as a subset of a file modification being a normal pattern. If verification fails, with no ransomware attacks, new data is updated to old known copy. Otherwise, old good copy is preserved. UFS keeps track of rich set of file versioning across data silos which make it easy for an IT administrator to perform the recovery. Security control plane do real time ransomware attack signature monitoring as well. Hence, ransomware attack is detected as part of a new backup epoch update or through pro-active monitoring process. When every a new data is fail to match the ransomware attack signatures, it will meet the data qualification. Data qualification parameters can be set as frequency of data changes, amount of data changes etc.

As user data fragmented according to information theory based on erasure coding combining compression, encryption and deduplication, data is further optimized at compression level and deduplication level. Since secure vault is not listening on any IP or known port, network worms such as ransomware cannot penetrate to systems hosting secure vault modules. So, in a typical data flow, data gets ingested, packaged in a data set, sent to control plane for metadata processing, security plane for security data processing and data plane for file user data storage after applying configured data services. On a data access, metadata and data are separately extracted to provide local file system access semantics. As UFS is based upon split data plane, metadata plane and security plane architecture, different data silos can be stitched together even though user data is stored at a different location or connected to end systems through different storage protocols. If security plane is intrinsically part of a single location, it's very difficult and complex to do security monitoring, security control on other UFS modules and secure vault. The combination of the disaggregated architecture of control plane, decentralized data plane, security plane with converged data, metadata and security services, make UFS very novel and market-first in the context of data stored in different sites, clouds connected through different storage protocols.

Together, centralized metadata controller acts as a control plane, decentralized data plane that runs in various office locations, storage silos in the clouds, and security plane running in the secondary metadata controller or as a separate service running in a separate data center, UFS system becomes integrated, highly available with data redundancy built in, and with total security services. As the target user data is stored across various cloud storage services, with erasure coding or replication across, there is no vendor lock-in issues or outage issues affecting the availability of user data when needed for recovery.

UFS (for Universal File System, which is part of this invention) is not a file system for primary storage use cases and not invented for that use case. UFS provide a data platform for universal data governance, GDPR compliance, Cyber Security with a central control plane and a decentralized data plane, with split metadata and data plane architecture. Actual user data is decentralized, as data is stored across different cloud storage services in hybrid cloud architecture. Metadata is centrally synced the core UFS module. With all metadata at one place, data protection officer now experience a universal data visibility and control. As user data is not at one place, data is better protected from cyber security related attacks. Storage can be divided into shards or erasure coded and resulting fragments can be sent to different cloud storage services like AWS, Google Cloud, Azure or in on-Premise based private cloud storage services.

Universal File System, as it decouples the file storage assets from its actual location, it implements Universal File Virtualization, driven by system instructions, input by 11003, SD Controller.

As Universal File System can access any data, move any data from any location, Universal file system also make the data services virtual, meaning data can be backed up from any location by steering a copy to clouds, and same copy can be moved to archives by removing the primary copy from the data sources, any file object can be migrated from any data source to any other data source, like it move the data to cloud. Hence, a customer using UFS do not need to purchase separate system for backup, cloud archiving, storage migration etc. With System defined control plane, any data now can be shared with any other user having the access rights, allowing Universal file sharing. With Universal File System, now any file data object can be searched, universally. With Universal file system, now any form of dark data can be discovered. With the help of Universal File system, any file having Personally Identifiable (PII) content for sensitive data can be detected easily as metadata gathers the information for files having sensitive data which is available at the central controller for universal search.

All file system activity of Universal file system is securely audited. All audit logs are first sent to multiple data clouds in chunks, and then SHA of every such audit chunks are stored in an immutable storage medium such as Tapes or sent to popular e-mail systems or to Blockchain service offering tamper proof storage endurance SLAs. Various forms of content based search tools can be employed to detect sensitive files and can apply this universally across the Universal file system. Universal data fabric, which is the core premise of universal file system, gives unprecedented data privacy controls to user data, as it allows central control, ownership management of files. All data can be delegated to specific user, based on ownership rights or Role based access control. Access rights can be revoked on business needs, all file activities can be tracked, full life cycle management and end to end file security policy management can be easily configured at central control plane.

Any file having any type of sensitive content can be detected by the UFS, no matter this file is stored. UFS module has a distributed sensitive data detection intelligence built in. As data in the cloud infrastructure, be it in SaaS, PaaS or IaaS, all data can be fully controlled from the on-Premise gateway which can be running in any customer-owned data center. This capability provides an "outsource storage, without outsourcing data control" experience to customers. Without a universal data fabric, offering universal control and visibility, no privacy and security controls can be enforced by the IT. IT administrative rights itself can be hierarchical. In the unlikely event that new breed virus such as ransomware, could enter into data hosts and when it tries to modify the file such as encrypting it for claiming the ransom, encrypted file will just become another version, as original version remains intact and tamper proof. Immutability was built in at system level, which can be further verified by TPM (Trusted Platform Module) or based on virtual TPM in an exemplary embodiment.

As Universal File system is fully driven by the System Defined instructions, a data administrator can now Universal data services operations, in a single scoop, such as removal of all files with extension .jpeg, or owned by user john, and it can be applied to all data sources. Similarly, through a single command from the SD controller, entire file data assets stored in all data sources can be backed up to dispersed cloud services or secure vault, multiple data sources can selected and archived to dispersed cloud in a single work flow, simplifying file data management operations of a global corporation having data stored in different silos and various forms of cloud services, such simplified mechanisms for universal data services are very critical.

In additions to above data services, different variations of data governance, data forensics, cloud data life cycle services, cloud data storage deduplication can be performed easily through such a Universal file system, providing an overarching data flow and metadata flow path ways, allowing any data services, offered to any data object, with total decoupling experience of data object with data source. Core UFS host agent module, 156, which is also an NFS served module is explained in detail below.

Figure 6:
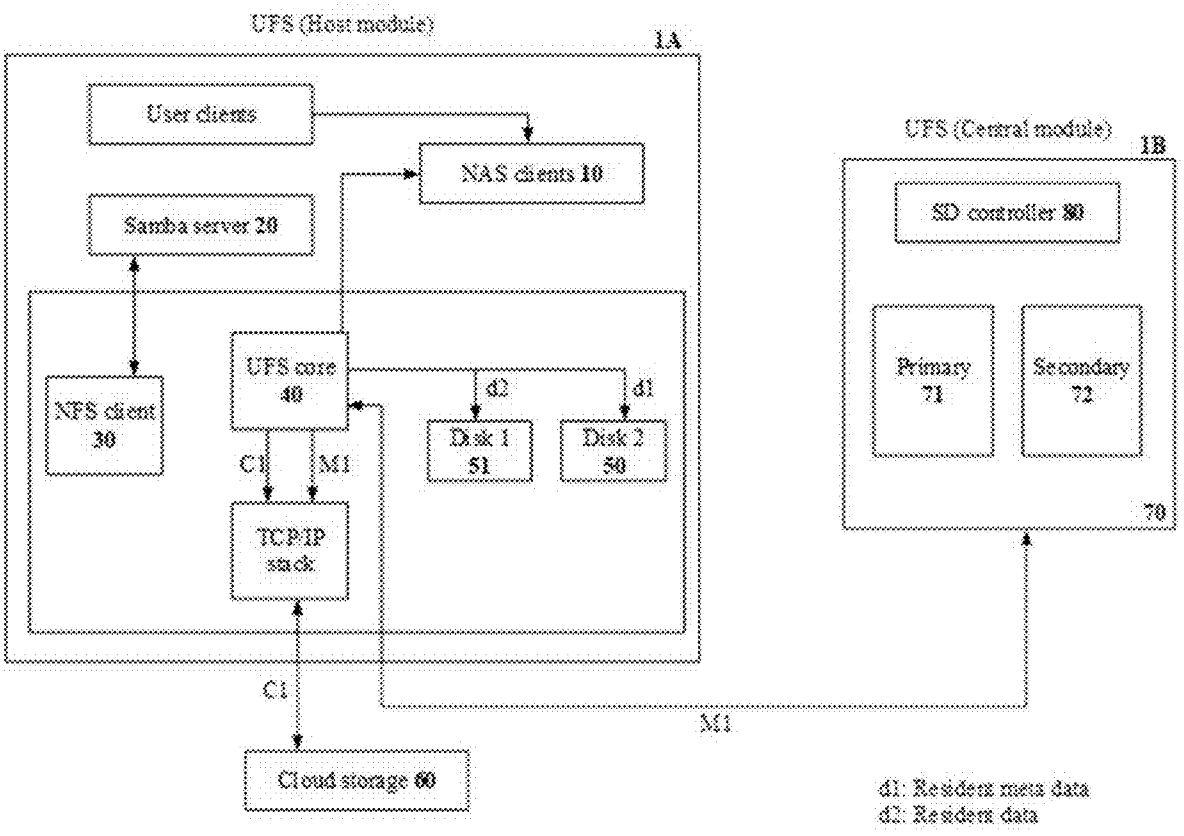
FIG. 6 explains in detail the aspects of UFS core module that presents a file system level interface to the IT, for all data stored outside the data center.

Referring to FIG. 6 with Labels 1A and 1B:

UFS host module, 1A runs in a Virtual Machine or in physical system on a Linux machine. User clients or data user can contact this system through a Samba Server or through NAS clients. If access is performed over NFS mounts, as shown by 10, all NAS protocol requests are transmitted to UFS module core which is the file system driver, 40 over NFS protocol. If access is performed over Samba server, which is mounted to a Windows client machine, Samba server can in turn host the storage through an in-kernel NFS client, which in turn redirects the request to UFS core module, over NFS interface. UFS core module stores data in storage partition 51 and metadata in storage partition 50. Meta data also implemented in flat files, so any file system folders can also be used as storage partitions. Here Data and Metadata are stored in separate directory partitions or in separate file systems. 1B is the central metadata controller which keeps all consolidated metadata. MI shown as the data line connecting 1A and 1B indicate the metadata flow in both directions. Metadata flows from central controller to UFS host module when there is a data update happens from other sources. Metadata flows from host module to central controller, when data update happens at UFS host module itself. Cl indicate the actual user data flow from host module through hybrid cloud storage layer through the TCP/IP stack of the system running the UFS module. Metadata controller will have one or more metadata nodes for High Availability. 80 is the interface for providing system defined data services.

When data is synced from the central metadata controller It also has all information such as the actual data source like which cloud service like G-Suite, Box or so on and so forth. Or which remote office, like the location name, data owner in terms of universal owner ID. Every branch, or Remote offices and cloud services get registered in the central control plane 11000 and also unique user ids, gets created for every user in every type of service. The same user id, in whatever the form, gets embedded in the metadata, which is synced to 156. 156 also will be referred as the Universal File System or Universal File Manager OR UFS module. As data is directed to various cloud services, and metadata is updated to Universal file system is driven by the clear instructions at system level, from the module 11003, the Universal File System also called as Universal File Virtualization system. Invention stores data in the hybrid cloud layer with or without dispersal layer. And metadata is stored in 11000 and also in the VM or the Linux system running the Universal File System. Universal File system can also be implemented in other Operating system like Windows or Mac OS as part of different embodiment.

One example of universal ID can be the email address of the employee, which is unique across the organization. Universal file system, based on the metadata, classify data in the file system in various folders, according the various types of the data sources. For example, G-Sute, Box, Dropbox, Remote office in London, South Africa, Branch in London will be displayed as different folders. Data can be displayed in different forms as needed by the company. All data sources may send data streams in different forms or interfaces. For example data from remote offices may send the streams in a tar file format, which then processed by the ROBO module in the central controller, split the data streams and metadata streams and storing data to clouds, while metadata is synced back to the UFS module running in the corporate data center. Similarly cloud data sources send data streams in different cloud interfaces, which then processed by the cloud module in the central controller, splitting data and metadata. Branch gateways 152 at 11004 (representing one of the branch site in one embodiment of the invention) and 164 at 11005 also split data from the metadata and will be sending data as object formats, using direct cloud APIs, like as in S3 or will be sending data in object like format, similar to CDMI, to private storage cloud service hosted by the company. Branch gateways may be sending metadata to central controller, which then get synced to UFS module.

In essence, all metadata from all data sources will be consolidated at central controller, which is replicated to secondary, and then synced back to UFS modules, such as in 156 running at the site 11006. There can be one or more instances of the UFS modules. UFS modules, central metadata controller, Branch gateways, ROBO modules all communicate in network tolerant manner. In one embodiment, this can be provided by SD-WAN (System Defined Wide Area Network). SD-WAN controller can also be hosted as part of central metadata controller, and can be in tandem with the SD controller module as in 11003. In this case, UFS file delivery can work like a SD-WAN native Wide Area File services experience to customer.

As new regulations like GDPR (General Data Protection Regulation) requires a universal visibility, control of all data regardless of the data locations, this invention provide a unique benefit providing a single source of truth for all data and a way to manage all file storage assets in a single scoop. As UFS bring all data at the data center, like a single logical drive, data protection officer having access to any Virtual machine running the UFS module (Data controller node in GDPR parlance, can locate any data assets, and do any form of permission control, data controls, and data managements to these data, even when the actual data was stored through an outsourced storage services (data processor in the GDPR parlance). Through the UFS modules, any data can be deleted regardless of where its stored and can be located universally. With UFS file system, data can now be deleted whether actual data is stored G-suite, Box, or branch office data servers or in the local data stores accessible to UFS module.

There are many distributed file systems, but all need the deployment of various parts of the file systems, having same form of data sources and interfaces. UFS allows heterogeneous data sources like system agents at Remote offices, oAuth based interfaces at cloud services, system agents deployed in cloud servers (as in 157 and 158 for hosted servers in the cloud). Invention connect all this disparate data sources, into one logical drive, located at any part of the world, and operated by different providers. This invention provides a new file system level interface, that can universally access, manipulate data stored any cloud services, any SaaS services, any cloud based servers, any data center based servers as a single logical pool. Universal File system also controlled and programmed by a system defined controller and has a split data and metadata plane architecture.

Universal module built upon an n-way distributed unit which is another key aspect of the building block of the invention. Meta data module was also specifically built for file system metadata. Every file object will have a unique number for its ancestral distance from the root of the tree, positional index of it with respect to other members at the same distance, including the objects having different parents, and also the positional index of the object with respect other members having the same parent. All child members of the same parent are stored within the same file, allowing locality reference on metadata lookup. As all metadata is stored in flat files, managing the metadata is easier. Every metadata write operation will also generate a Write ahead logging journal, which then synced back to the central metadata controller. In this way, regardless of where the IO operation happened at the data sources, data is steered to cloud storage services, while metadata is centrally consolidated, which then resynced to the systems running the UFS host modules. At any given time, UFS system may not have the data upon access by a user. UFS module however will transparently bring in user data from the clouds on demand.

Many cloud users now get a fine data control experience as all data in cloud based collaboration or SaaS services are now made available as if it's in a local drive, through UFS. With this data control, now cloud data security is enhanced. All data in cloud services, SaaS services are otherwise integrated through various APIs offered by the provider and always ended up in a separate data silo. Data in the remote offices also ended up in a separate data silo, prior to this invention. Universal File system, converge all such data silos, as a single logical drive.

Single logical drive of the Universal File system will not store the actual user data other than the purpose of data processing. Once data is no longer is accessed beyond a threshold period, it is migrated back to decentralized, cloud storage layer. Every CIO or IT heads or Data protection officer, look for a central control and visibility for their universal data distributed or fragmented across various storage silos. At the same time, they cannot centralize the actual user data as that will cause a single point of failure at infrastructure level. While centralize data control and visibility, they strongly desire a decentralized storage layer for maximum data security and availability. Universal File System provide this unique benefit to market.

The invention thus brings out a novel file system, for universal data sources, which also implement a set of novel data services fully controlled by system defined user commands, truly realizing the potential of system defined, Universal File services or Wide area file services and Universal file storage virtualization with the integration of a federation of hybrid cloud storage infrastructure. Every UFS module receives configuration information from System controller to enable certain data services or not. For example, at a particular data silo, data compression and data deduplication may be configured to be enabled and encryption and reed-solomon erasure coding to be disabled. And also configure the order of data services as compression first and then deduplication. Data controller part of this UFS module, with this configuration, only executes compression and deduplication in this order. UFS module will then send the transformed data, as binary objects to data containers. UFS module will then send the metadata describing the object id, object location and security configuration data, as to encryption being active, data services status to System controller. System Controller will re-distribute this to other UFS modules. On data requests from UFS module, UFS module will apply data services in reverse order.

Other aspect of the invention is, it stores user data in cyber secured data vault hosted within the company premises, if not stored in public storage clouds again in a decentralized architecture, which is further referred as Secure Vault, employing secure network isolation technology to protect the data from cyber security related attacks. Such data Vault will typically be able to store up to 96 Terabytes per vault. The main uniqueness of this Secure Data Vault, storing the user data portion of the Universal File System is that, Cyber-attacks like Ransomware virus cannot enter into data vault over a network connection, as there is no transport protocols connection allowed from any system in the network (LAN, WAN, MAN or from Cloud) to the data vault. Data Vault use a special technology, where data Vault itself decide to which system it can get data from and send data to, and by itself connect to that system, with a control connection initiated to another system.

Secure data vault employ special TCP connection setup and data transfer technologies in such a way that, data can be synced from Universal File system modules, Metadata controllers or Branch gateways, synchronously to the Data vault, without any TCP or any other transport connection made from external systems to data vault. Secure Vault achieves this capability by playing the role as a "Client" in Transport connection phase, and giving "Server" role to other, selected system, which is identified by the master controller node, running in the central metadata controller. On data transfer phase, secure Vault change its role from "Client" to Server, while external data sources change its state from "Server" to client, to be able to send to, and receive data from secure Vault synchronously. This transition is done right after the TCP three way handshakes is performed, and just before the data transfer begins by having secure Vault itself is waiting for data to arrive from selected data sources. Additional control and monitoring intelligence will detect if such external data sources are not in the approved list of data nodes that has the permissions to exchange data with secure Vault. Additionally, Metadata controller node, running Machine Learning and AI based anomaly detection, behavioral data collection to detect if any unwanted network data activity is taking place, to secure Vault, flagging the event as a potential attempt through cyber-attacks or Ransomware activity.

Organizations always lose track of some types of data that they think it never existed or forgotten the path names/ locations etc. which are generally classified as dark data. Universal file system allows the data protection officer to search and locate files based on the path names, content, time its stored, source of data location, user id, business events, as UFS metadata has the capabilities to embed extra intelligence to tag files based on above such parameters, and further allow lookups based on those parameters.

Another special feature of Universal File System is that, these mechanisms further secure the decentralized data vaults from cyber security challenges or attacks like ransomware. There will be at least two secure Vaults, if user data is not stored in clouds. User data of the Universal File System may be decentralized across any combination of secure Vault which runs in company premise, and across a pool of hybrid cloud resources. When one of the data Vault is down, it doesn't affect the data availability. Storage may be replicated or erasure coded across data vaults. Data vaults may run on-Premise data centers or in a hybrid-cloud infrastructure.

Yet another aspect of the invention is that, every branch gateway, or UFS core module or the central metadata controller, has the ability to compress, de-duplicate the data chunks across universal data sources. As de-duplicated chunk hashes, which can be based on various generations of md5 or SHA based algorithms, are stored in central, highly available metadata controller, which can be retrieved by any node that de-duplicates data, any duplicate chunk hash can be looked up by any node which is part of the Universal file system. This aspect of the derived inventive method is otherwise not available in any distributed file system. Additionally, de-duplicated chunk further stored in a redundant manner with reed-solomon based erasure coding technology. This way of implementing Universal file storage de-duplication as part of the functionality of a file system makes the Universal file system a best fit for storing less active data sets, securely and with optimum storage utilization. Same data, in different file name in a cloud service like G-Drive, Box, Dropbox, and a User PC in a remote office, or a file in a server in the data center, will now reduce to a single, unique data blocks. Other Global de-duplication system does not have this ability spanning across heterogeneous data silos, and also do not store the data.

Core UFS module, 156 at the location labeled as 11006, can also be running from any other location. Update on each gateway will result in other gateways being synced, in near-real time manner, controlled by the central SD-Controller (labeled as 11003). This way files can be shared, distributed or made available for global access across all locations of the company spread across Wide Area Network, giving the title of the invention as a Secure, Wide Area File Services. All data services like backup of the data at any location, migration of files between any location are centrally controlled by the system defined controller, this can also be looked at as Universal file system having system-defined data services. All files at data source, de-duplicate the file with a universal chunk data base, compress the file, encrypt it with a random or user supplied key, then applied to erasure coding and send to secure data vaults or various clouds, all controlled by SD controller.

Various erasure coded fragments can be further directed across various routers spread across the universe across different paths, say one path goes through Atlantic, while the other path go through Pacific. In this fashion, when file fragments are migrated, no man-in-the-middle attacker can access the data, which is any way encrypted and erasure coded, As all data can be stored in secure data vaults which are isolated from any in-bound network connections, data security at rest, transit, and network attack levels are eliminated. Periodic data integrity checks are performed universally with SHA checks, validating the integrity of the data. Every file activity is centrally audited, with an optional integration with block chain, for tamper proof storage of file hashes. All these security mechanisms are otherwise, not available in any WAN scale files system.

Detailed aspects of the security enforcement are applied to all data assets, from the central metadata control which is also play the role as a security enforcement point. Security metrics include the type of the file data that is further shown by its very type of it. For instance, .xls say that it's an XL based financial document, .cpp say that is a system program written in C++ Language so on and so forth. Owner id of the file, source location of the file data, time file was ingested into the UFS, and organization data governance policies as it required by various compliance regulations like GDPR, HIPPA, SOX, ISO etc. Data Governance also includes data retention policies, archival media types, data access rights and various data control metrics. All these security parameters are entered to metadata controller through SD-controller interface, Data governance requires interfaces to enter security and governance policies, system to store and retain the policies, and an ability to apply to every file data assets centrally.

This invention make these tasks possible system as it has interface to receive all security parameters through SD controller, can store and protect these security parameters through metadata controller, and can access every file data assets centrally either through core UFS module at file system level, or through a graphical user interface running as part of metadata controller. Graphical User Interface running in the metadata make file access possible over a graphical user interface. When certain operations are performed, such as changing the access rights or retention policies, it's distributed to all parts of the UFS system. Other than making all file data objects located at various, heterogeneous data sources, to one large, integrated file system, it also implement various data security services like data governance, central data security controls, integrated data protection and migration services as part of the overall system.

As explained, Universal file system thus not only provide file delivery service when a user access the file system, it also converge various data services like backup to cloud, archiving to cloud, storage migration across locations, cloud storage life cycle management, data governance, universal data search, dark data discovery, universal file storage de-duplication, secure data vaults, central control and visibility, decentralized storage with built in redundancy all as a single, converged solution. This speaks further to the novelty of the invention.

UFS can optionally use block chain technologies to make tamper proof, file activity auditing. UFS anyway record every storage activity, if configured and sent to security controller. As metadata controller and SD controller, and security services which are running as part of metadata controller, collect all activity logs, which are further dispersed to cloud storage services, and additionally SHA fingerprint of those file activity audit logs are stored in publicly available block chain based distributed ledger, which is a tamper proof, distributed database. Block chain Application programming Interface storage of data securely and without being tampered.

Other Distributed file system has the same interface to all location, such as file system mount in a local machine. Universal file system that we invented has dissimilar interfaces, such local file system mount in on-premise gateway, Google cloud APIs in G-DRIVE, backup agents in Remote sites and so on. When a file is viewed from other sites, a user thinks that the file is as if, it is created by local file system. As another copy of the data is available in other sites, or in the clouds, and also metadata is distributed with redundancy, universal file system has single point of failure. When a ROBO, logins to a central portal, which is running as a cloud service and uploads files through a browser, file is stored redundantly on multiple through data containers in on-Premise or clouds and metadata is synced across all metadata controllers. All files, though created through dissimilar interfaces, made to be uniform and local-hence the name Universal file storage virtualization. Same technologies can be used to virtualize block level or object level data as well. Instead of file metadata, block level or object level metadata can be used in driving the storage migration and movements across sites or clouds or across on-premise to clouds or from clouds to on-premise.

In the explanations above, there are many detailed embodiments which can be the derivative work. Metadata controllers, System Controllers, Security Controllers and Data controllers can be integrated in a single system in at least one embodiment. Metadata controllers can be placed inside the on-premise as well or primary metadata controller within on-Premise and secondary being operated in the cloud. Metadata controllers, receive various application requests, to align storage virtualization according to policies. For example, an API can request certain data, owned or created by certain site or service, to be hidden from other users, whereas a similar request can cause certain site data to be instantly replicated to public storage clouds, and so on. In the invention, a processor executes one or more system mechanisms, to perform file storage virtualization.

Implementation Specific Details:

As the invention has many different forms of embodiments and different components can be grouped in different ways, implementation steps will be different according to the specific embodiment. When source data is collected at UFS module and sent to system controller for transmission to security controller and data containers, security profile data will be modified from the one set to next set as it traverse from UFS module to system controller. UFS module will construct a security profile as per the local knowledge of the data. For example, if UFS module is running as an agent module in client system, it may treat a file as unclassified file if this UFS module is not configured to receive security configuration update from System controller. It will construct its security type as NORMAL and create data sets with the various metadata attributes of the file and send to system controller. System controller, having latest security configuration updates received from the user, can determine that its security policy is set as classified. It will then create a different set of security profile for this file before process it and send the data portion of it in object form after performing configured data services for the file in question. Security Configuration and Security Profile are interchangeable in many embodiments. In some cases, security profile is static security configuration such as file types, file owner identification. The security profile also be based on provisioned data security services entered by the user through system controller. This could mean to turn on erasure coding and encryption or data auditing for this particular file data. Security Configuration can be dynamic such based on file content. When UFS module, while creating data sets and performing data services, may learn that its content has sensitive data, it will dynamically update the security configuration of this file object and send this information to security controller. Security controller will further redistribute the security profile, also known as security policies and modified security configuration of the file object to other UFS modules and Security Controller. Most situations, security profile data remain same before performing data services and after performing data services. On data access requests received at the configured UFS module, it has to look up the updated security profile of the file object first before trying to access the data. UFS module will fetch the latest security profile from the security controller. This happens when data protection officers or data officers may change the security access control credentials at any time through System controller. UFS provide different forms of data services to be applied to file objects in a unified manner, across data silos. System controller has to get configuration data for the services to be enabled at a specific UFS module or data silo. Services include data compression, data integrity monitoring, data activity monitoring, data auditing, erasure coding, compression, de-duplication, storage intrusion services encryption. Selected data services information, will be updated to every UFS module and security controller through system controller. UFS module in at least one embodiment, maintain data files as objects in binary form in a storage media with versioning support. Whenever an object is updated, it receives a new version. Old version becomes immutable and data objects are stored as versioned, binary objects in the data containers. This is useful to prevent data from cyber-attacks such as ransomware. User will enter data classification policies to indicate critical data sets. One data classification policy can be a list of strings contained in the file name to indicate critical file. If the filename contains this string, its classified as critical. It will provide additional data services. Data administrator does not know how to differentiate ransomware attacks. So, user can enter policies by which data changes can be qualified as good changes as opposed to changes due to network worms. Similarly, policies for deciding a specific data as valid also can be entered into the system controller configuration data base. One example of a valid data is file having a specific entry on a specific offset. Similarly, qualification of a data change as good change rather than a change due to an attack can be, file modification at related region of the file that had changes recently. For example, this could be a data base file getting update on similar regions due to a database table. Such criteria of data qualification parameters and data validity parameters are entered through UFS configuration unit or through System controller. When data is updated on the UFS module with qualified, validated change, UFS will update the versions, with an epoch change. This storage epoch change will advance the latest version as the most updated, gold copy of the file. If storage auditing is configured, UFS module will log every file system operation including the file information and the user id performed the operation. As UFS is deployed as secondary storage platform, user id will be data management officer. UFS module can choose the data containers to send the data to, through data controller, UFS module has a configuration data base for allowing the user to select the list of data containers as part of the data controller of the UFS module. One configuration can be 5 containers, wherein 3 containers are secure vault object in on-Premise and two data containers can be object storage services offered by third party cloud providers, forming a hybrid-cloud storage architecture in a decentralized manner. It's decentralized as there is no sharing of data content across any data containers or no co-ordination needed amongst data containers.

In normal operations, security controller keeps monitoring every activity going on UFS modules and on-Premise data containers through a security agent unit installed in the system running UFS module and secure vault. System activity include number of processes running on the system, input and output activity on the system, cpu load on the system so on and so forth. In at least one embodiment, Data containers or secure vault is running in a system with no static IP configured. Security controller, System controller and UFS module as a unit, called data proxy to communicate to data container and can exchange commands such as heart beats, system data, uptime through send operations or receive operations. During data send operations, data proxy will keep the data in a queue and inform the data vault through heart beat and data vault will pull it from data proxy. Similarly, on receive operation, secure vault will send the data to data proxy through similar heart beat mechanism.

Advantages of the Claimed Invention:

In one embodiment, the claimed invention helps in stitching together all fragmented data silos across various geographically distributed sites across different data centers and cloud services as a centrally controllable data hub through control plane capabilities, while actual data storage is stored in decentralized data vaults through data plane capabilities for cyber resilience, with information security assurance deeply integrated to data foundation through security plane capabilities. In some other embodiments, this invention underpins the products and technologies as a data governance platform which requires security by design and automated capabilities of controlling and governing the data stored across various sites of the company in disparate storage systems and data silos, without actually making any changes to primary storage platforms. In many embodiments, the invention introduce the first data platform with built in security and data mobility across sites, powered through the file virtualization capabilities delivered on secondary storage platforms. Unlike other distributed filesystems, UFS has the disaggregated control plane, data plane and security plane architecture, making the unified delivery of variety of data management, data protection and data security services, based on global policies and data classifications, applied to data storage independent of its locations. As UFS truly de-couple storage, access and security capabilities from its location this the best choice to be used as a data governance solution or mass data fragmentation solution without cyber threats. As invention converge all secondary storage across data silos in one place, Chief information officers now get a single pane of data access with central control, without worrying on single point of breach. UFS does not store full data of any file at any location in most embodiments. So data loss of subset of locations reveals no information or loss no data with continuous security monitoring and storage activity surveillance. This makes Universal File System an ideal choice for long term, secure archive use cases. As Universal File Virtualization is combined with data protection from all attached data silos, the invention is the first industry solution for providing secure data management to various remote and branch offices of a distributed enterprise. As UFS has content awareness and data classification built in with various data services like encryption, erasure coding, data activity auditing, ransomware attack mitigation, storage intrusion detection and active response which can be applied across multiple data repositories, UFS system provide the best choice for storing sensitive and critical data sets like Defense, Public Sector, Financial institutions and Healthcare verticals. No existing technologies available to provide this technology as part of a file system.

In yet another embodiment, UFS provide immunity to quantum computing threat to cryptography as there is no single piece of the data is stored in any single place. As UFS place user data in erasure coded data containers, storage security is based on information theory not computational which cannot be broken by crypto breaks through quantum computing.

What is claimed is:

1. A system for implementing a multi-site file system, the system comprising a system controller, a security controller, a plurality of secure vaults and a plurality of Universal File System (UFS) modules, the plurality of UFS modules configured to execute a method comprising the steps of:

receiving data sets from a plurality of data sources;

extracting metadata, user data and security profile data from the received data;

transferring the security profile data to the security controller;

sending the metadata and security configuration data, to the system controller, by a first UFS module of the plurality of UFS modules;

receiving the security configuration data at the system controller, from the first UFS module;

pushing the security configuration data to the security controller, by the system controller;

re-distributing the metadata and the security configuration data to the plurality UFS modules, other than the first UFS module, by the system controller;

transforming user data to split pieces of data in the form of objects at the system controller;

wherein each of the plurality of secure vaults is configured to execute a method comprising the steps of:

initiating connections with a data proxy;

using reverse Transmission Control Protocol (TCP) flow for data exchange;

exchanging data with the data proxy over the reverse TCP flow;

storing the data as immutable objects;

responding to a first set of command and data requests from the security controller;

responding to a second set of command and data requests from the system controller;

responding to a third set of command and data requests from a selected UFS module of the plurality of UFS modules;

wherein the security controller centrally monitors each UFS module of the plurality of UFS modules and also the plurality of secure vaults, wherein the plurality of UFS modules retrieve the metadata from a local storage, and the user data from the plurality of secure vaults and the security profile from the security controller, in response to receiving a data request.

2. An architecture for implementing a multi-site file system with security by design, having a disaggregated control plane, a decentralized data plane and a security plane, delivering data security services, the architecture further comprising:

a plurality of Universal File System (UFS) modules;

a system controller consisting of a data proxy, a security controller and a plurality of data containers attached to a data controller as part of the decentralized data plane;

wherein the plurality of data containers are configured to execute a method comprising the steps of:

exchanging data without any open ports for in-bound Transmission Control Protocol/Internet Protocol (TCP/IP) connection requests;

exchanging messages with the data proxy to initiate data exchange;

executing data receive operation using a reverse TCP flow;

executing data send operation, using the reverse TCP flow; and storing the data in immutable, versioned objects;

wherein the plurality of data containers are connected to the security controller which is configured to execute a method comprising the steps of:

receiving security profile data from the system controller;

performing activity monitoring on the plurality of UFS modules and the plurality of data containers;

extracting system activity events from the plurality of UFS modules and the plurality of data containers;

processing security events data for detecting any anomaly, for triggering the security response parameters; and initiating the attack response actions in accordance with security response parameters on at least one data container of the plurality of data containers associated with the data controller or on at least one UFS module of the plurality of UFS modules upon detecting any storage activity anomaly, wherein the decentralized data plane keeps user data stored as securely split pieces at different locations, revealing no information.

3. The architecture of claim 2, wherein the system controller and the security controller are connected to a plurality of data containers in a decentralized manner, while the user data, metadata and the security data get transmitted over data plane, control plane and security plane respectively, with the security data and the metadata distributed to the plurality of UFS modules across sites.

4. The architecture of claim 2, wherein the plurality of UFS modules retrieve the metadata from a local storage and user data from the plurality of data containers associated with data controller and the security profile from the security controller in response to receiving a data request from a user.

5. The architecture of claim 2, further comprising the steps of:

receiving data sets from a plurality of data sources at a plurality of data silos;

extracting metadata, user data and security profile data from the received data sets;

transferring the metadata to the system controller;

transferring the security profile and security configuration data to the security controller;

sending the metadata and the security configuration data, to the system controller, by a selected UFS module of the plurality of UFS modules; and re-distributing the metadata and the security configuration data to the plurality UFS modules, other than the selected UFS module, by the system controller.

* * * * *